United States Patent [19]

Stewart

[11] Patent Number: 5,265,121

[45] Date of Patent: Nov. 23, 1993

[54] SPREAD SPECTRUM COHERENT PROCESSOR

[75] Inventor: Clarence H. Stewart, McLean, Va.

[73] Assignee: Juanita H. Stewart, McLean, Va.

[21] Appl. No.: 791,670

[22] Filed: Nov. 14, 1991

Related U.S. Application Data

[60] Continuation-in-part of Ser. No. 581,337, Sep. 19, 1990, Pat. No. 5,103,460, which is a division of Ser. No. 422,838, Oct. 17, 1989, Pat. No. 5,016,256.

[51] Int. Cl.⁵ .................................................. H04B 1/10
[52] U.S. Cl. .......................................... 375/99; 375/1
[58] Field of Search ............................. 375/1, 57, 99

[56] References Cited

U.S. PATENT DOCUMENTS

| | | | |
|---|---|---|---|
| 3,980,945 | 9/1976 | Bickford | 325/30 |
| 4,217,586 | 8/1980 | McGuffin | 343/100 LE |
| 4,247,939 | 1/1981 | Stromwald et al. | 375/1 |
| 4,308,617 | 12/1981 | German, Jr. | 375/1 |
| 4,309,769 | 1/1982 | Taylor, Jr. | 375/1 |
| 4,388,723 | 6/1983 | Keen | 375/1 |
| 4,490,829 | 12/1984 | Van Etten | 375/1 |
| 4,545,059 | 10/1985 | Spinks, Jr. et al. | 375/1 |
| 4,607,375 | 8/1986 | Lee | 375/2.2 |
| 4,630,283 | 12/1986 | Schiff | 375/1 |
| 4,649,549 | 3/1987 | Halpern et al. | 375/1 |
| 4,651,327 | 3/1987 | Fujita | 375/1 |
| 4,656,642 | 4/1987 | Apastolos et al. | 375/1 |
| 4,670,885 | 6/1987 | Parl et al. | 375/1 |
| 4,701,934 | 10/1987 | Jasper | 375/1 |
| 4,740,792 | 4/1988 | Sagey et al. | 342/457 |
| 4,807,256 | 2/1989 | Holmes et al. | 375/97 |
| 4,821,294 | 4/1989 | Thomas, Jr. | 375/96 |
| 4,897,659 | 1/1990 | Mellan | 342/45 |
| 4,905,221 | 2/1990 | Ichiyoshi | 370/18 |
| 4,922,506 | 5/1990 | McCallister et al. | 375/1 |
| 4,985,899 | 1/1991 | Walsh | 375/1 |
| 5,016,256 | 5/1991 | Stewart | 375/1 |
| 5,103,460 | 4/1992 | Stewart | 375/1 |
| 5,113,409 | 5/1992 | Stewart | 375/1 |

OTHER PUBLICATIONS

Robert C. Dixon, Spread Spectrum Systems, John Wiley & Sons, Inc., 1984, pp. 193–196.

Primary Examiner—Salvatore Cangialosi
Attorney, Agent, or Firm—David Newman & Associates

[57] ABSTRACT

A delay device for delaying a received signal as a delayed-received signal, and a correlator for estimating a phase angle between the received signal and the delayed-received signal. A parametric encoder estimates a phase angle between the received signal and a delayed-received signal.

4 Claims, 19 Drawing Sheets

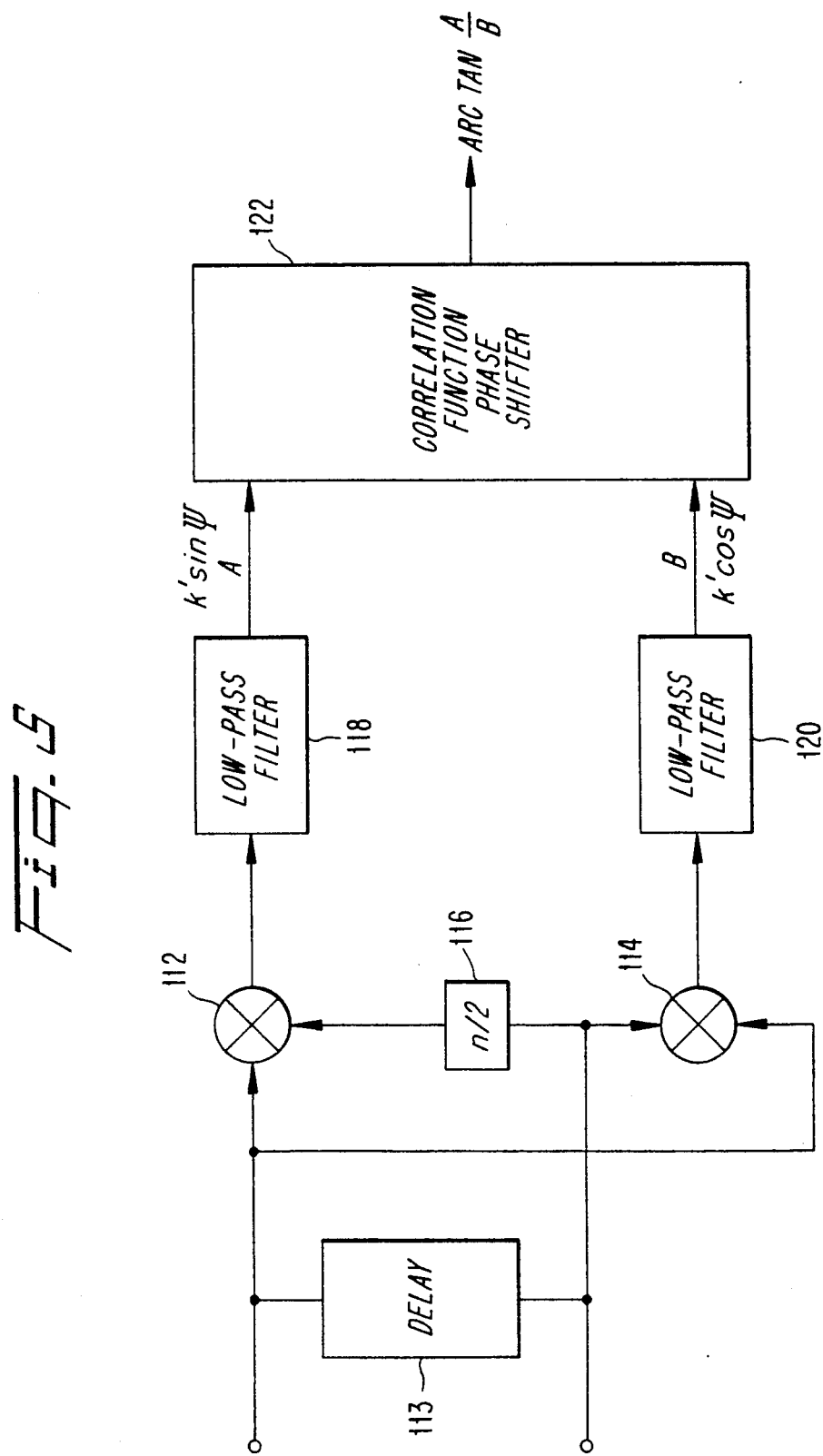

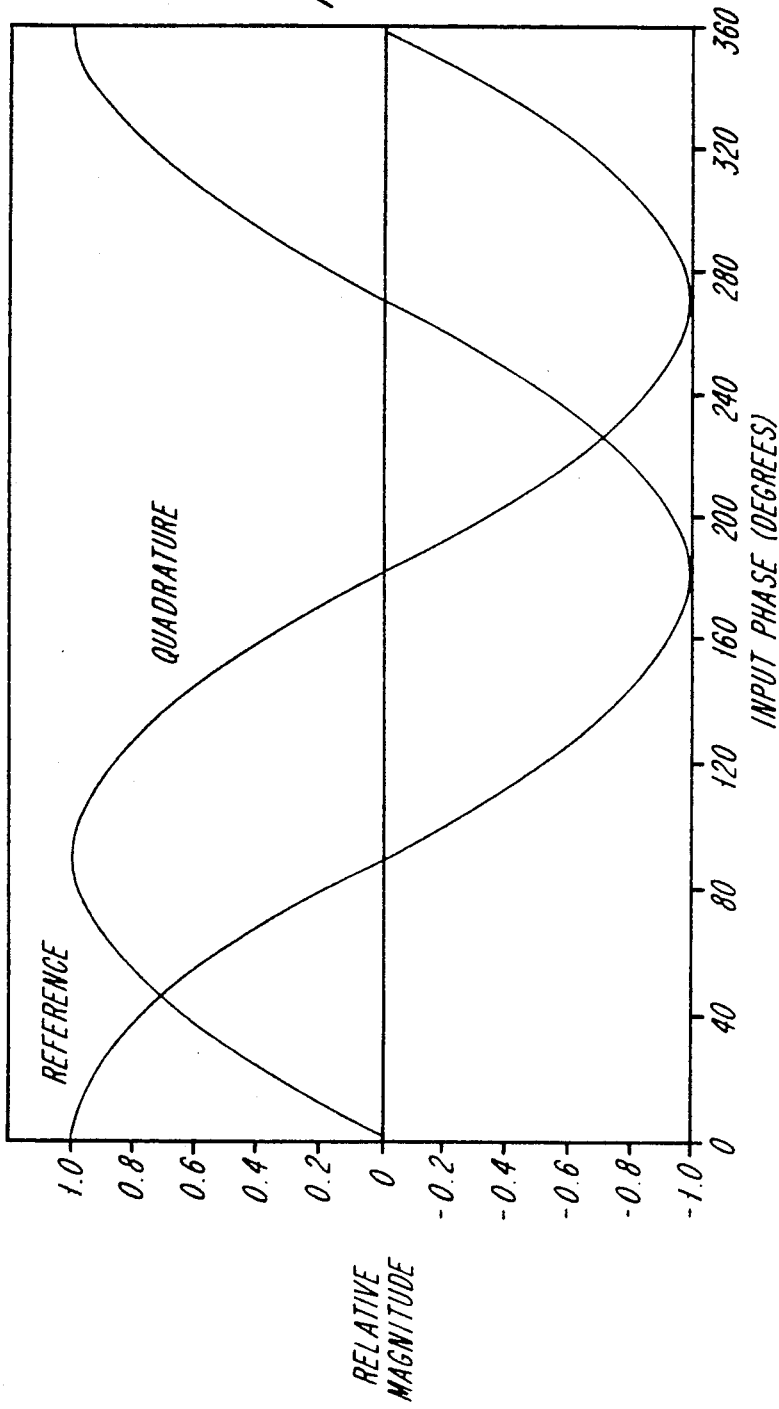

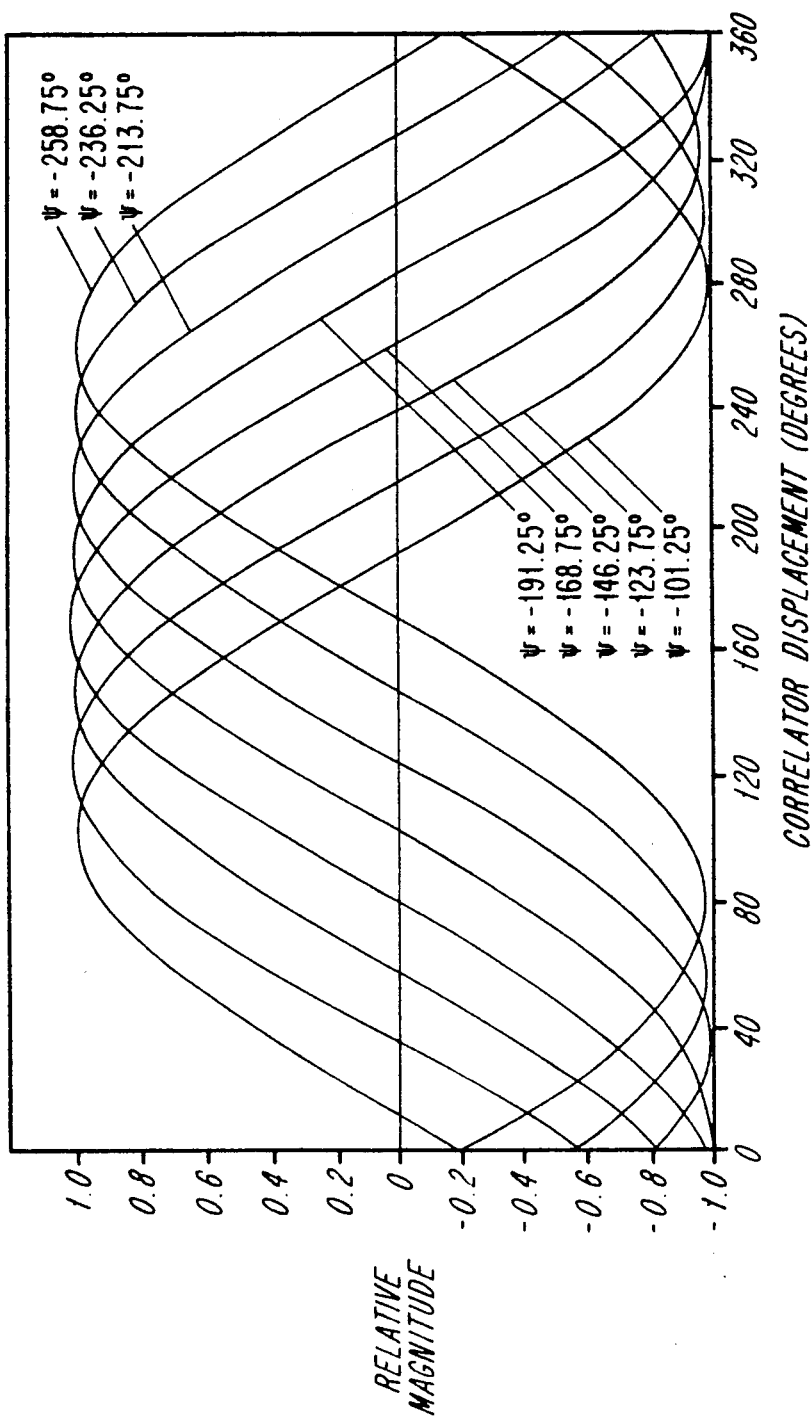

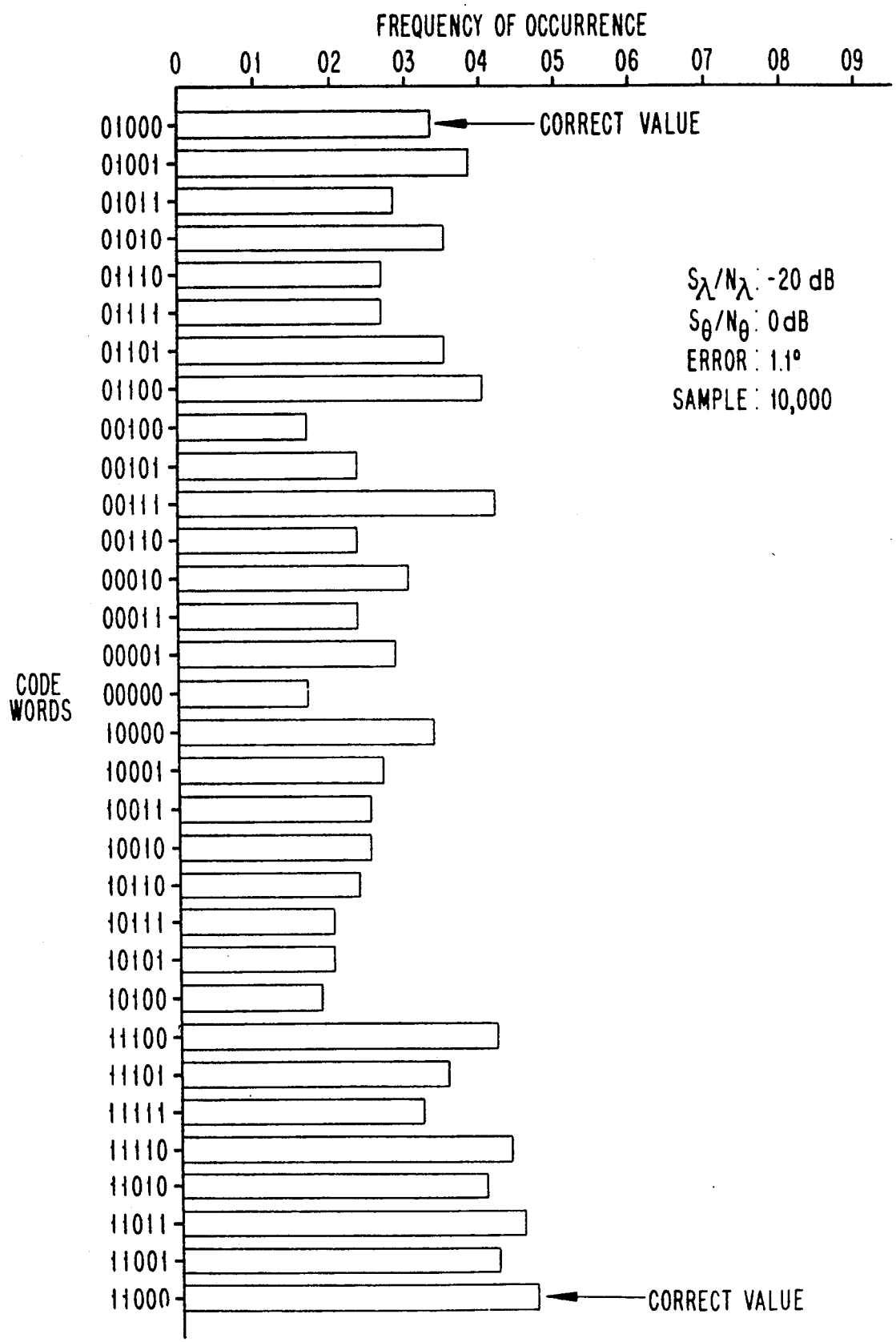

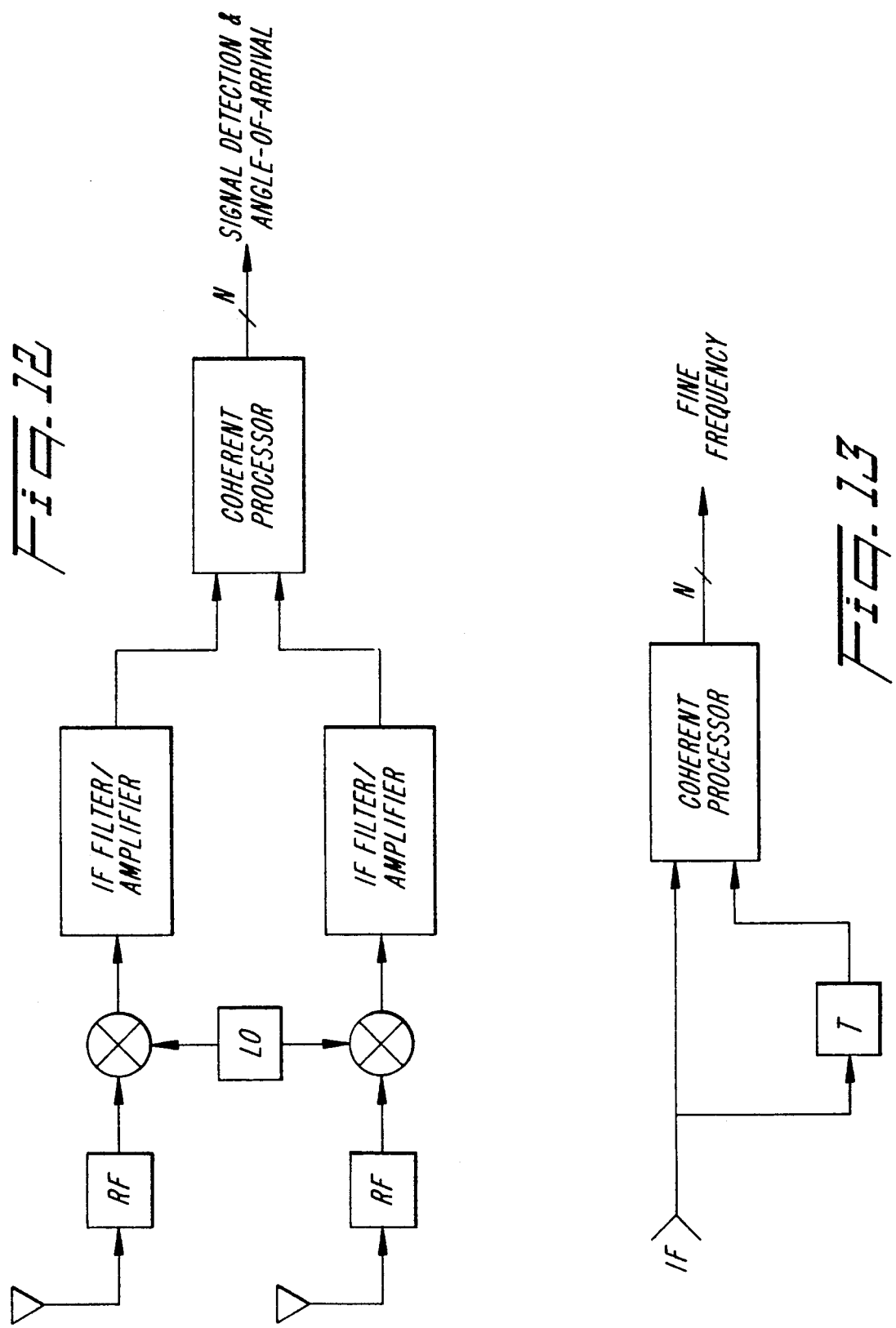

SIGNAL·GAUSSIAN NOISE

COHERENT PROCESSOR
MULTIPLE SAMPLE ADDITION

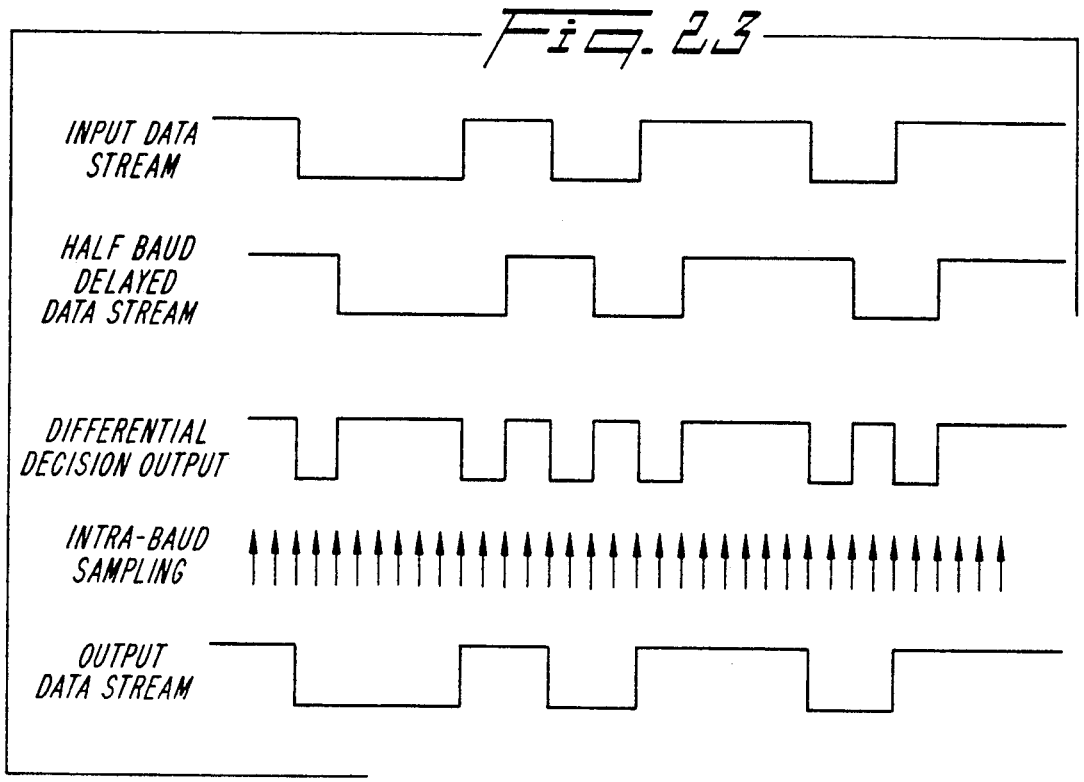
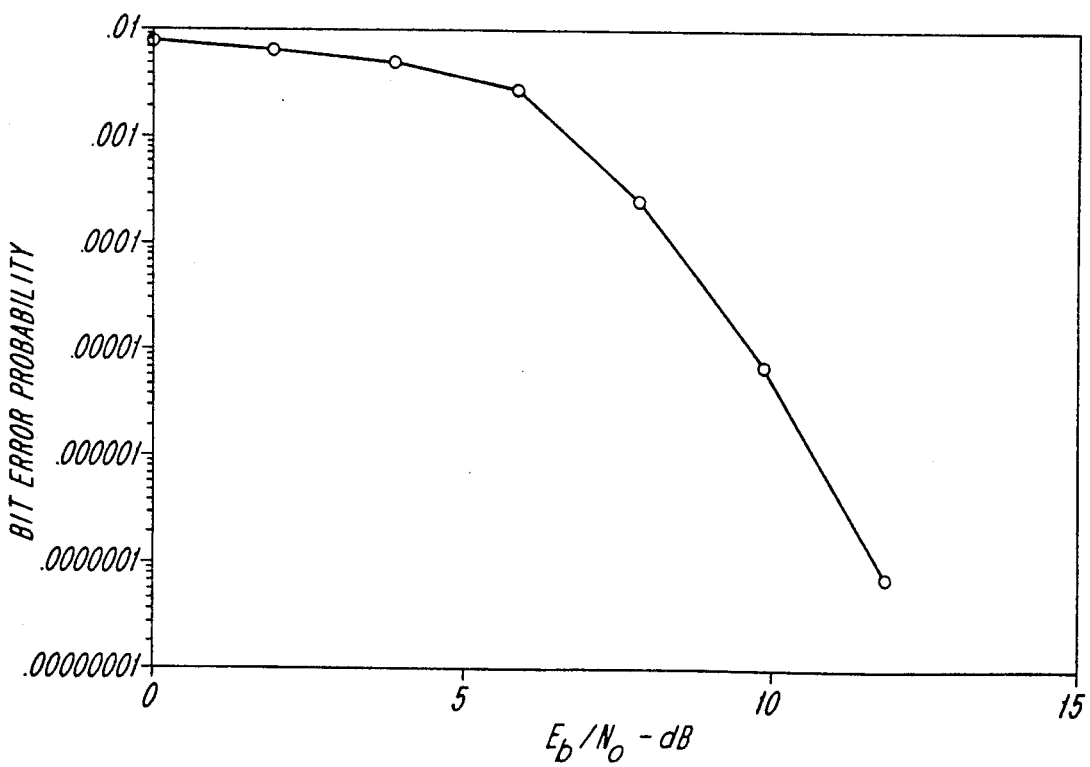

SPREAD SPECTRUM COHERENT PROCESSOR

RELATED PATENTS

This patent is a continuation-in-part of patent application entitled, SPREAD SPECTRUM INTERCEPT METHOD AND APPARATUS, having Ser. No. 07/581,337, filing date Sep. 19, 1990, now U.S. Pat. No. 5,103,460 which is a divisional patent application of a prior patent application entitled, SPREAD SPECTRUM INTERCEPT APPARATUS AND METHOD, having Ser. No. 07/422,838, filing date of Oct. 17, 1989, and now U.S. Pat. No. 5,016,256.

BACKGROUND OF THE INVENTION

This invention relates to a frequency hopping and direct sequence spread-spectrum receiver system and, more particularly, to a spread-spectrum coherent processor for estimating frequency, angle-of-arrival (phase), and time-of-arrival of frequency-hopped and direct-sequence spread-spectrum signals.

DESCRIPTION OF THE RELEVANT ART

Spread-spectrum signals have been utilized in the past for secure communications, due to the pseudo-random coding employed and the fact that the spread-spectrum signals are barely above or below the receiver noise level. Because of the spread spectrum and the manner in which that signal is generated, it is difficult to either detect the presence of the spread-spectrum signal or to demodulate the signal, without a priori knowledge of the particular pseudo-random phase-shift code.

One type of spread-spectrum signal is called a direct sequence (DS) spread-spectrum signal. This signal is often generated by rapidly changing the phase of a narrowband signal from 0° to 180°, in a pseudo-randomly-known fashion. The effect of pseudo-randomly varying the phase of the signal is to spread the frequency spectrum of the original signal in a (sin X)/X fashion. The pseudo-random phase changes are coded such that a predetermined series of phase changes are made to occur, with both the sender and the recipient knowing the code. The code might, for instance, involve shifting from a phase of 0° to 180° at a time $T_1$ and then shifting back to 0° phase one microsecond later, with a further phase shift to 180° three microseconds later, etc.

The spreading of the signal spectrum is such that the spread-spectrum bandwidth is 2/(minimum code length). In the above example, the minimum code length would be one microsecond, and the signal is therefore spread to a bandwidth of 2 MHz.

By spreading the signal in this manner, the signal may appear just above the receiver noise level. For an individual knowing the exact pseudo-random code, the individual can set his receiver so as to change phase exactly in time with the transmitted signal. Having done this, the pseudo-random phase changes are canceled, which results in the signal being brought out of the noise. The coherent addition of the chips in each bit demodulates a received spread-spectrum signal, producing the original data or bit stream.

There is no reason for the received signal to be above the noise floor; in robust waveforms or systems, the received signal may be less than to 10 dB below the noise floor. Other than HF, where the dominant received noise is larger than the system noise, the reference to noise is always in the context of receiver or system noise.

Link closure, spread or unspread, requires some finite indicated power P. The object of spreading is to reduce the power spectral density by the ratio of data-to-spread bandwidth which is defined as the processing gain of the system waveform; e.g., if a 1 kbps signal required 10 watts effective radiated power for link closure, then a 1000:1 chip-to-bit spread waveform, transmitting 1 kbps, would reduce the power spectral density 1000:1; i.e., from 10 mW/Hz to 10 microwatts/Hz. The total power is constant. Synchronization of the local pseudo random sequence with the received signal produces coherent addition of 1000 chips for each bit, increasing the signal-to-noise ratio (SNR) of each bit decision by 30 Db.

Another type of spread-spectrum signal is called frequency-hopped (FH) spread spectrum. This signal is generated by rapidly changing the frequency of a narrowband signal across a wide bandwidth in a pseudo-randomly-known fashion. The effect of pseudo-randomly changing the frequency of the signal is to spread the frequency spectrum of the original signal over the wide bandwidth of the frequency hopping. The pseudo-random frequency changes are coded such that a predetermined series of frequency changes are made to occur, with both the sender and the recipient knowing the code.

U.S. Pat. No. 4,247,939, to Stromswold et al., issued Jan. 27, 1981, which is incorporated herein by reference, describes a spread-spectrum detector utilizing compressive receiver techniques and squaring of an incoming signal, to detect the presence of a spread-spectrum signal and to obtain its center frequency, with the squaring canceling the pseudo-random code. This is the first stage of a Costas loop. The squaring produces the second harmonic of the carrier, suppressed by the BPSK. The frequency of the squared signal is divided by two and is used to demodulate the signal. This patent discloses using a dispersive display line as a narrowband filter set to detect the center frequency.

To date, no particular method or apparatus makes an efficient measurement of a hybrid or compound frequency-hopping spread-spectrum signal and detecting that signal with a low signal-to-noise ratio.

Ordinary frequency-hopping spread spectrum has many very effective demodulation schemes. The frequency-hopped spread-spectrum signal is spread over a wide bandwidth, but is not considered a low-probability-of-intercept (LPI) signal. A hybrid signal using frequency-hopping, direct-sequence, time-hopping (TH), or compound FH/DS/TH signal, transmits generally a direct sequence spreading, i.e., high chip-rate BPSK, of each frequency dwell. As with fixed-frequency direct-sequence spread spectrum, frequency-hopping spread spectrum produces the decrease in power spectral density of each dwell goes as $2/\tau$ per chip, where $\tau$ is the period of time for which the frequency-hopping signal dwells at a particular frequency. The hybrid or compound FH/DS/TH signal exhibits the low received SNR for the same reasons as the fixed-frequency direct-sequence spread-spectrum waveform.

OBJECTS OF THE INVENTION

A general object of the present invention is to provide a powerful and robust technique for determining the frequency of an input signal, using a delay line discriminator.

Another object of the present invention is to provide a frequency and phase measurement technique which operates at low signal-to-noise ratios.

An additional object of the invention is to provide a frequency and phase detector that is insensitive to input waveform type and noise.

A still further object of the invention is to provide a detector having a performance which is identical for any type of intentional modulation forms, including random noise.

Another object of the invention is to infer frequency domain and time domain attributes of a received signal from the phase shift introduced by a delay line.

SUMMARY OF THE INVENTION

A first embodiment of the present invention may employ a first antenna, a second antenna, first channelizing means, second channelizing means, measuring means, and generating means. The first channelizing means and the second channelizing means are optional.

The first antenna outputs a first sample of the received signal. The second antenna outputs a second sample of the received signal. The first channelizing means channelizes the spectrum of the first sample of the received signal from the first antenna into a first plurality of spectrum segments, with each spectrum segment having a corresponding segment signal, respectively. The second channelizing means channelizes the spectrum of the second sample of the received signal from the second antenna into a second plurality of spectrum segments having the same center frequencies and bandwidths as the first plurality of spectrum segments. Each spectrum segment of the second plurality of spectrum segments has a corresponding segment signal, respectively. The measuring means measures a corresponding plurality of frequencies and time of arrival of each of the first plurality of segment signals, respectively, and estimates a plurality of segment phase angles between corresponding segment signals having the same center frequency, of the first and second plurality of segment signals from the first channelizing means and the second channelizing means, respectively. The frequency, phase, and time generating means generates from the plurality of frequencies, times of arrival and phase angles, a frequency estimate, time of arrival estimate and a phase estimate of an angle of arrival, respectively, of the received signal.

A second embodiment of the present invention comprises delay means and phase means. The delay means delays a received signal between a first port and a second port. The delay means may be embodied as a delay line connected between the first port and the second port, or as two antennas which serve as the first port and the second port. For the delay line, a received signal is assumed at the first port, and a delayed-received signal, which is the received signal passed through the delay line, is at the second port. For the two antennas, the first antenna receives the received signal, and the second antenna receives a delayed-received signal, which is a function of the distance between the two antennas, angle of arrival of the received signal, and wavelength or frequency of the received signal. The angle of arrival is assumed to be known, possibly from an independent source.

The phase means correlates the received signal from the first port with the delayed-received signal from the second port to generate a phase estimate. The phase estimate is a function of the delay between the first port and the second port and wavelength or frequency of the received signal. Thus, the phase estimate can be used to generate a frequency estimate.

Additional objects and advantages of the invention are set forth, in part, in the description which follows and, in part, are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 5 is a block diagram of the correlation phase detector according to the present invention;

FIGS. 6A and 6B are in-phase and quadrature-phase correlator transfer functions;

FIG. 7 illustrates a displaced correlation function;

FIG. 11B illustrates a posteriori averaging;

FIG. 12 illustrates an application where angle of-arrival is a correlative parameter;

FIG. 13 illustrates an application where frequency is a correlative parameter;

FIG. 23 illustrates BPSK differential demodulation; and

FIG. 24 depicts coherent processor BPSK performance.

DETAILED DESCRIPTION OF THE PREFERRED EMBODIMENTS

Figure 1:
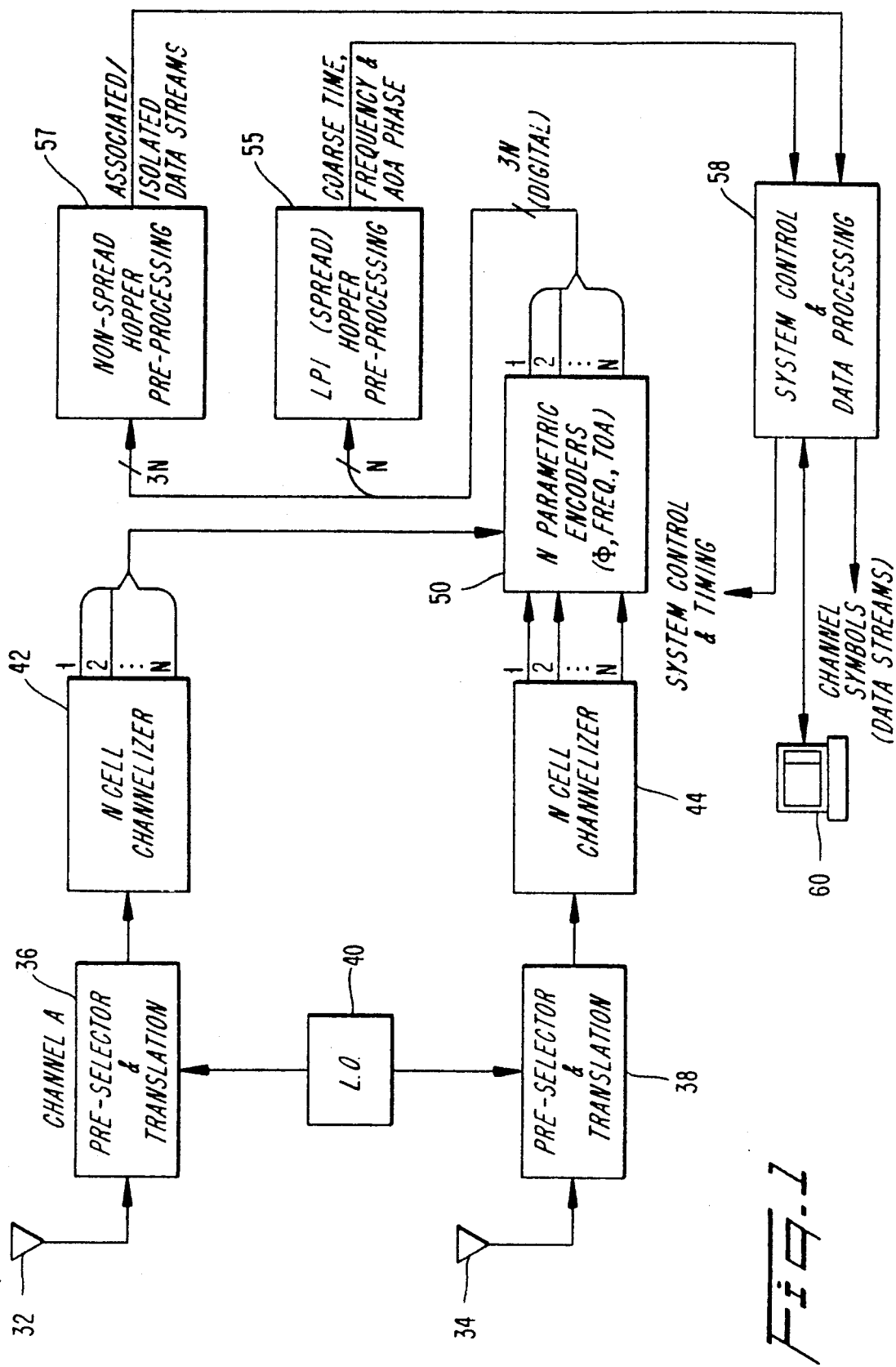
FIG. 1 is a block diagram of a frequency-hopping spread-spectrum detector.

Reference will now be made in detail to the present preferred embodiments of the invention, examples of which are illustrated in the accompanying drawings, wherein like reference numerals indicate like elements throughout the several views.

As illustratively shown in FIG. 1, a first embodiment of an apparatus for detecting a received signal having spread spectrum modulation is provided, comprising a first antenna 32, a second antenna 34, first channelizing means, second channelizing means, measuring means, and generating means. The first channelizing means and the second channelizing means are optional. First channelizing means, second channelizing means, and measuring means may be embodied as first channelizer 42, second channelizer 44, and parametric encoders 50. The generating means may be embodied as LPI hopper preprocessor 55 and/or nonspread hopper preprocessor 57. A particular embodiment of the invention may further include local oscillator 40, first preselector and translator 36, second preselector and translator 38, system control and data processor 58, and output display 60.

In the exemplary arrangement shown, the first antenna 32 is coupled through first preselector and translator 36 to first channelizer 42. The second antenna 34 is coupled through second preselector and translator 38 to second channelizer 44. Frequency translation in first and second preselectors and translators 36, 38 is controlled by local oscillator 40. The first channelizer 42 and the second channelizer 44 are coupled to parametric encoders 50. If the first channelizer 42 and the second channelizer were not employed, then the first antenna 32 and second antenna 34 would be coupled to a parametric encoder 50. The parametric encoders 50 are coupled to non-spread hopper preprocessor 57 and LPI hopper preprocessor 55. The non-spread hopper preprocessor 57 and spread-hopper preprocessor 55 are coupled to system control and data processor 58, which is coupled to display 60.

The first antenna 32 outputs a first sample signal of the received signal. The second antenna 34 outputs a second sample signal of the received signal. The first and second preselectors and translators 36, 38 filter and frequency translate the first and second sample signals of the received signal, respectively, to an intermediate or baseband frequency range. The first channelizer 42 channelizes the spectrum of the first sample signal of the received signal, which has been filtered and frequency translated by first preselector and translator 36, into a first plurality of spectrum segments. Each of the first plurality of spectrum segments has a corresponding segment signal, respectively. Thus, a spectrum segment is a frequency domain representation of a segment signal. The first channelizer 42 may be embodied as a plurality of bandpass filters which divide the received bandwidth into a plurality of channels.

The second channelizer 44 channelizes the spectrum of the second sample signal of the received signal, which has been filtered and frequency-translated by second preselector and translator 38, into a second plurality of spectrum segments. The second plurality of spectrum segments has the same center frequencies and bandwidths as the corresponding first plurality of spectrum segments. Each spectrum segment of the second plurality of spectrum segments is a frequency domain representation of a corresponding segment signal, respectively. The second channelizer 44 may be embodied as a plurality of bandpass filters which divide the received bandwidth into a plurality of channels.

For received signals having a large signal-to-noise ratio, the parametric encoders 50 measure a corresponding plurality of frequencies and times of arrival of each of the first plurality of segment signals, respectively, and estimate a plurality of correlation function phase signals between corresponding segment signals having the same center frequency, of the first and second plurality of segment signals from the first channelizer 42 and the second channelizer 44, respectively. The non-spread hopper preprocessor 57, from the plurality of frequencies, times of arrival, and phase angles, generates a frequency estimate, a time of arrival and estimate, and a phase estimate of an angle of arrival, respectively, of the received signal.

For a spread-spectrum signal which is received having a low signal-to-noise ratio, the N parallel parametric encoders 50 generate a correlation function phase signal from which coarse frequency estimates, time-of-arrival estimates, and phase estimate of an angle of arrival of the received signal are generated by LPI hopper preprocessor 55. System control and data processor 58 control operation of the present invention and process data, and data are displayed on display 60.

Figure 2:
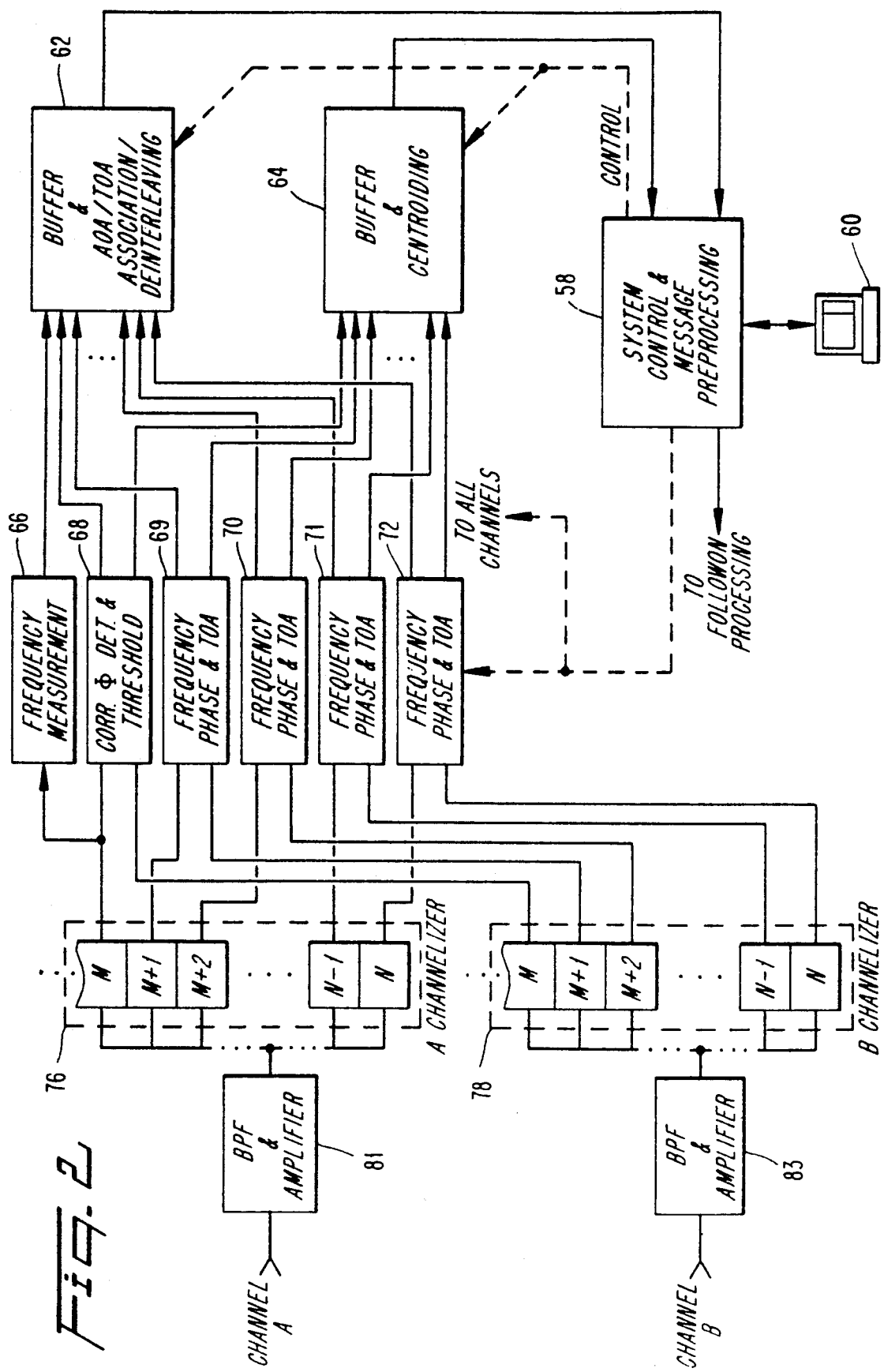
FIG. 2 illustrates a frequency-hopping, and direct-sequence spread-spectrum receiver system.

FIG. 2 illustrates a preferred embodiment of the present invention for a frequency-hopped and direct-sequence spread-spectrum receiver system. Shown in FIG. 2 are first bandpass filter and amplifier 81, second bandpass filter and amplifier 83, first channelizing means, second channelizing means, measuring means and generating means. First channelizing means is embodied as first channelizer 76, second channelizing means is embodied as second channelizer 78, and measuring means is embodied as frequency measurement device 66, correlation phase detector 68, and frequency, phase and time-of-arrival devices 69, 70, 71, 72. The generating means is embodied as buffer and centroiding device 64 and buffer and angle-of-arrival device 62.

As illustrated in FIG. 2, the frequency, phase, and time-of-arrival devices 66, 68, 69, 70, 71, 72 are coupled to corresponding channels having the same center frequency, respectively, of first channelizer 76 and second channelizer 78. The first and second channelizers 76, 78 are coupled to first and second bandpass filters 81, 83, respectively, which are coupled to first and second antennas, respectively.

In operation, the first antenna outputs a first sample signal of the received signal. The second antenna outputs a second sample signal of the received signal. The first and second bandpass filters 81, 83 filter the first and second sample signals of the received signal, respectively. The first channelizer 76 channelizes the spectrum of the first sample signal of the received signal, which has been filtered and frequency-translated by first bandpass filter 81, into a first plurality of spectrum segments having a corresponding segment signal, respectively.

The second channelizer 78 channelizes the spectrum of the second sample signal of the received signal, which has been filtered and frequency-translated by second bandpass filter 83, into a second plurality of spectrum segments. The second plurality of spectrum segments has the same center frequencies and bandwidths as the corresponding first plurality of spectrum segments. Each spectrum segment of the second plurality of spectrum segments has a corresponding segment signal, respectively.

The frequency, phase and time-of-arrival devices 69, 70, 71, 72 measure a corresponding plurality of frequencies and times-of-arrival of each of the first plurality of segment signals, respectively, and estimate a plurality of correlation function phase signals which represent the phase angles between corresponding segment signals having the same center frequency, of the first and second plurality of segment signals from the first channelizer 76 and the second channelizer 78, respectively. If a received signal is received having a large signal-to-noise ratio, then the buffer and angle-of-arrival device 62 generates, from the plurality of frequencies, times-of-arrival, and phase angles, a frequency estimate, a time-of-arrival estimate, and a phase estimate of an angle of arrival, respectively, of the received signal.

For a received signal having a low signal-to-noise ratio, the buffer and centroiding device 64, from the plurality of correlation function phase signals, generate a frequency estimate, a time-of-arrival estimate and a phase estimate of an angle of arrival, respectively, of the received signal. System control and data processor 58 control operation of the present invention and process data, and data are displayed on display 60.

Figure 3:
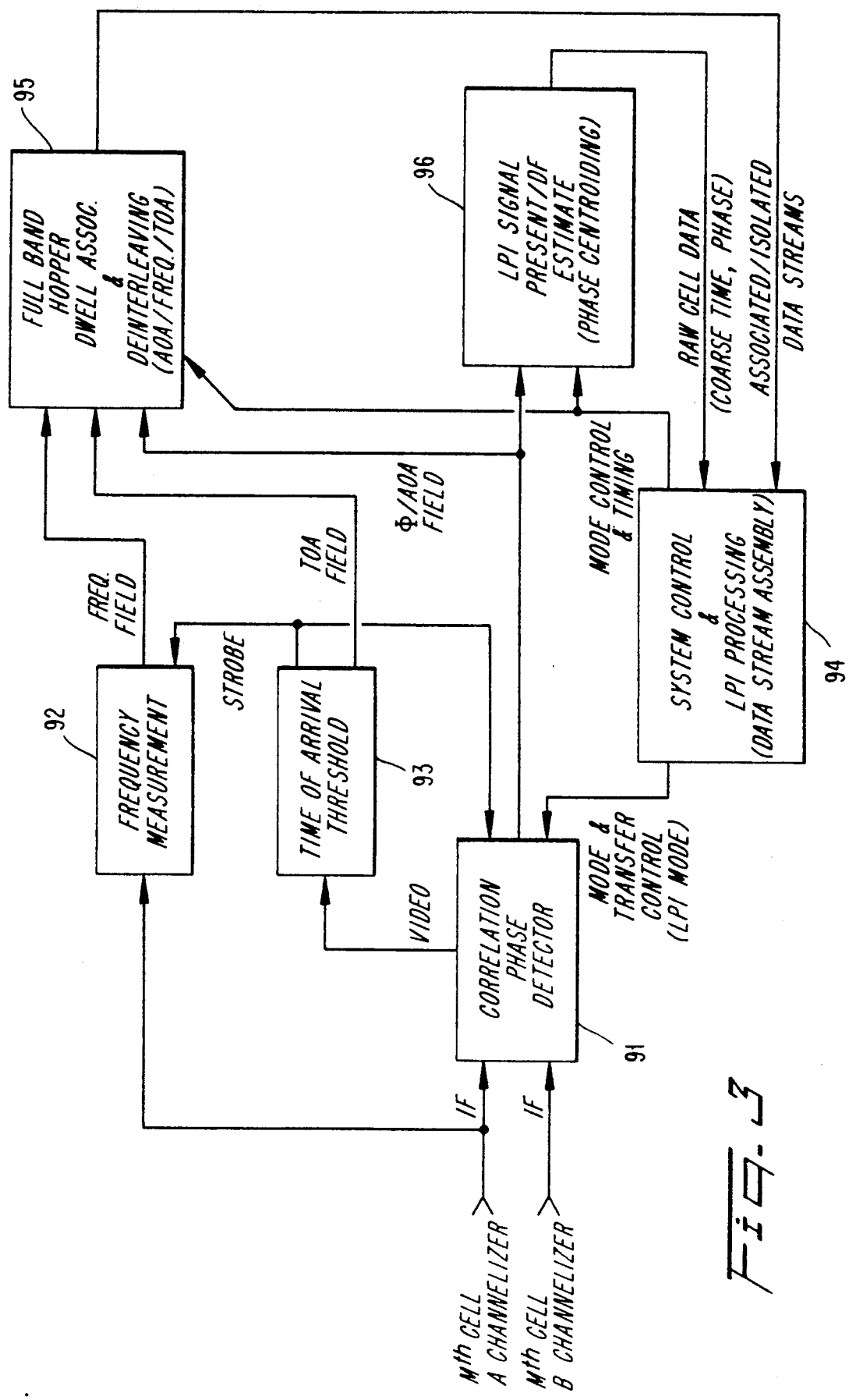
FIG. 3 is a block diagram of a channelizer/processor.

An embodiment of a frequency, phase, and time-of-arrival device is shown in FIG. 3. The device is coupled to the $M^{th}$ cell of a first channelizer and to the corresponding $M^{th}$ cell of a second channelizer. A frequency measurement device 92 is coupled to the $M^{th}$ cell of the first channelizer, and a time-of-arrival threshold device is coupled to the correlation phase detector 91. A full-band hopper device 95 is coupled to the frequency measurement device 92, the time-of-arrival device 93, and the correlation phase detector 91. A LPI signal device 96 is coupled to the correlation phase detector 91. A system control and LPI processor 94 is coupled to the correlation phase detector 91, the LPI signal device 96, and the full-band hopper device 95. Each cell at the output of the channelizers has the frequency, phase and time-of-arrival device as shown in FIG. 3.

In operation, the frequency measurement device 92 and time-of-arrival device 93 measure frequency and time-of-arrival of received signals having large signal-to-noise ratios, for example, greater than 7 Db. The phase is compared between the segment signal of first sample signal from the $M^{th}$ cell of the first channelizer and the segment signal of the second sample signal form the $M^{th}$ cell of the second channelizer. The phase angle is used to determine the angle of arrival of a received signal, relative to the first and second antennas.

For received signals having a low signal-to-noise ratio (SNR), the correlation phase detector 91 generates a correlation function phase signal, and LPI signal device 96 performs phase centroiding from the correlation function phase signals. The LPI signal device 96 can make a good estimate of the received signal, even at low signal-to-noise ratios. Assume that each cell has a bandwidth of 1 Mhz, and the cells are sampled at the rate of one million samples per second. If there were only uncorrelated noise at the input of a cell, since noise has a zero mean, then the averaged output over N samples generates an output of zero. If a received signal is present in a cell, then the received signal adds coherently, and a 30 dB gain can be achieved in one millisecond. In one millisecond there are 1000 samples, and coherent addition of 1000 samples can generate a 30 dB gain for a one millisecond time dwell per sample. For an intercepted, spatially-coherent signal having a −10 dB signal-to-noise ratio, this one millisecond time dwell, which can average 1000 time samples of correlation function phase signals, improves SNR by 30 dB, which yields a 20 dB SNR phase estimate. Thus one can have a high confidence that a signal is present in a particular cell, based on the phase estimate from that cell.

Assuming that there are N cells, if N−1 cells have noise and the $N^{th}$ cell has a received signal, then the samples of the phase estimate yield the presence of the received signal in the $N^{th}$ cell as measured by the phase centroid, and generate an estimate of frequency from the cell from which the estimate was made, and a time-of-arrival estimate.

In summary, from the output of the channelizers, one has a reasonable estimate of frequency, based on which cell develops a phase centroid. This holds for received signals having a low signal-to-noise ratio, since the estimate is derived from averaging the output of the phase detectors connected to each of the channelizer cell pairs.

Figure 4:
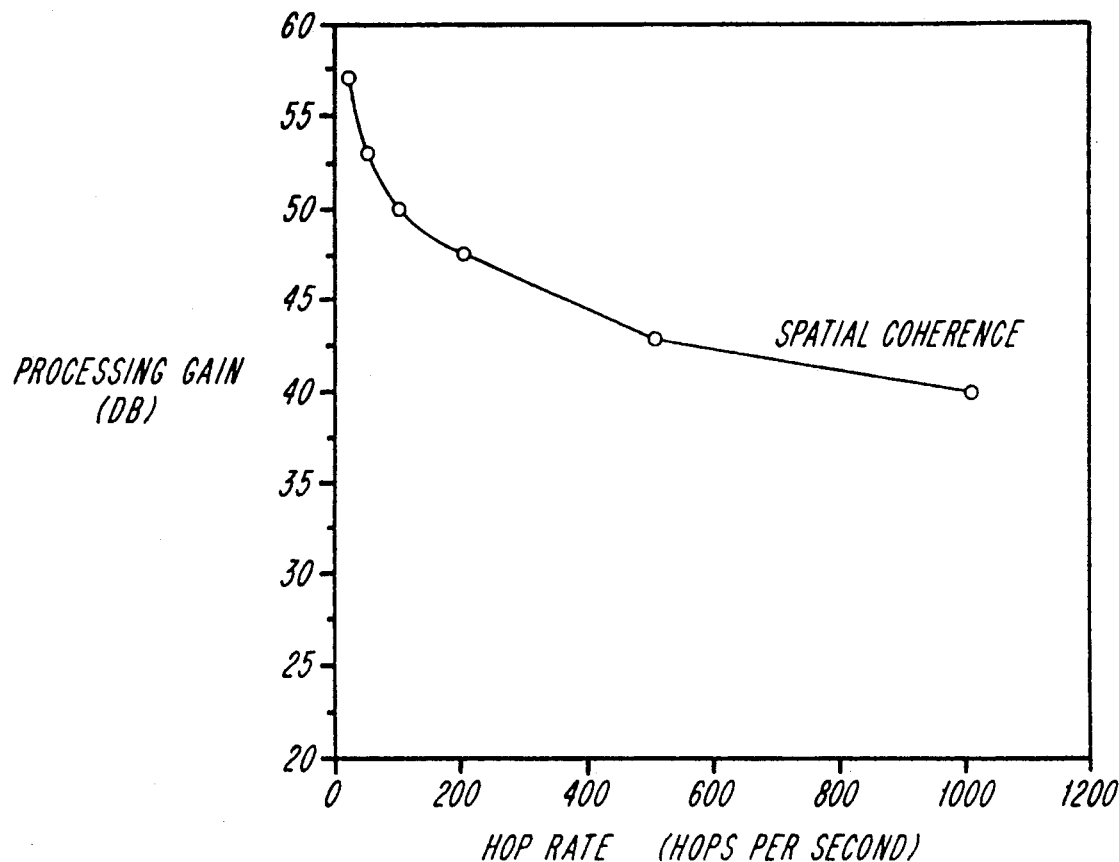
FIG. 4 illustrates the effect of hop rate on the processing gain.

FIG. 4 illustrates the processing gain in dB versus hop rate of a hybrid frequency-hopped spread-spectrum signal.

FIG. 5 shows phase means of the present invention embodied as a phase detector. A received signal is multiplied by first and second product device 112, 114. A delayed-received signal is multiplied by the received signal by second product device 114. The delayed-received signal is phase shifted 90° by phase shifter 116, and then multiplied by the received signal by first product device 112. The outputs of the first and second product devices 112, 114 are filtered by first and second low pass filters 118, 120, respectively. A correlation function phase shifter 122 generates a correlation function phase signal from the outputs of the first and second low pass filters 118, 120. By not using any limiting device, the estimates based on the correlation function phase signal are independent of signal-to-noise level. The correlation function phase signal is the relative phase between the received and delayed-received signals.

The second antenna 34 can be replaced by a delay device 113 which also couples to the first antenna 32. The delayed-received signal can be a delayed version of the received signal by delay device 113. The delay is used to decorrelate the system noise from the input port and for making frequency measurements.

The phase detector has application to low SNR measurement capability. The phase detector of FIG. 5 is an approach to phase or frequency measurement for a received signal having a SNR less than 0 dB. All other conventional phase-detection techniques hard-limit the input to mitigate amplitude variations, with the undesirable consequence of the hard limiting, that the transfer function completely degenerates at equal signal and noise powers, so that recovery of phase estimate for low SNR signals is impractical. Additionally, since the basic mechanism is a cross-correlation between the two input channels, performance of the phase detector of FIG. 5 is completely insensitive to the input waveform: amplitude modulation, phase modulation, frequency modulation, or a random Gaussian process. Performance is identical for any of the known forms of modulation. Consequently, the phase detector of FIG. 5 provides a very powerful and robust technique for recovery of the relative phase between two input channels.

The phase detector can be applied to a delay line type of discriminator, wherein the delay element is equal to or larger than the reciprocal of the bandwidth prior to the discriminator. The application of this correlation phase detector to delay-line discriminators can be used with received signals having low SNR.

Figure 8:
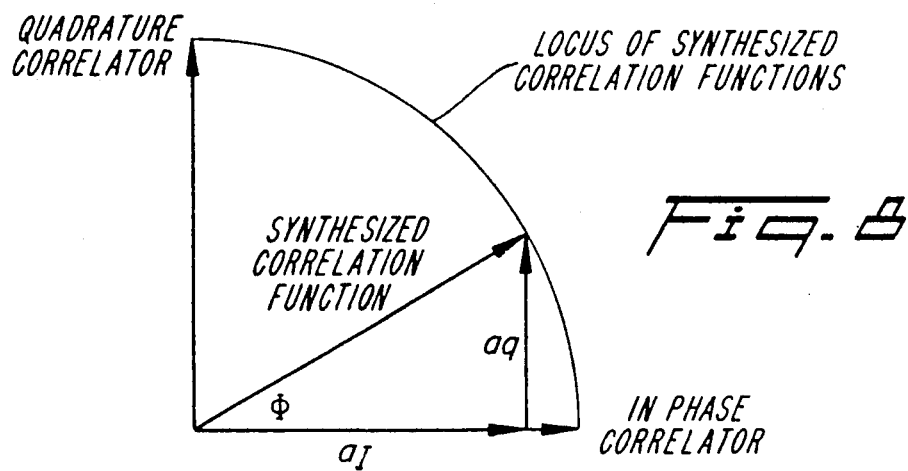
FIG. 8 illustrates the desired phase measurement and granularity produced by linear combinations of in-phase and quadrature-phase correlators.

FIGS. 6A depicts the in-phase and quadrature correlator transfer functions as the relative magnitude of the output of the correlation function, versus input phase in degrees. FIG. 6B is a truth table of single bit encoding of the in-phase and quadrature components of the correlator output. FIG. 7 shows the correlation functions synthesized from the outputs of the in-phase and quadrature correlator outputs. For five-bit quantization, there are zero crossings of the input-output transfer function every 11.25°. FIG. 8 illustrates how the desired phase measurement granularity is produced by linear combinations of in-phase and quadrature outputs of the correlators, shown as the locus of synthesized correlation functions. The phase granularity is 11.25°. FIG. 7 illustrates 8 of 14 displaced correlation functions needed for five-bit encoding.

Figure 9:
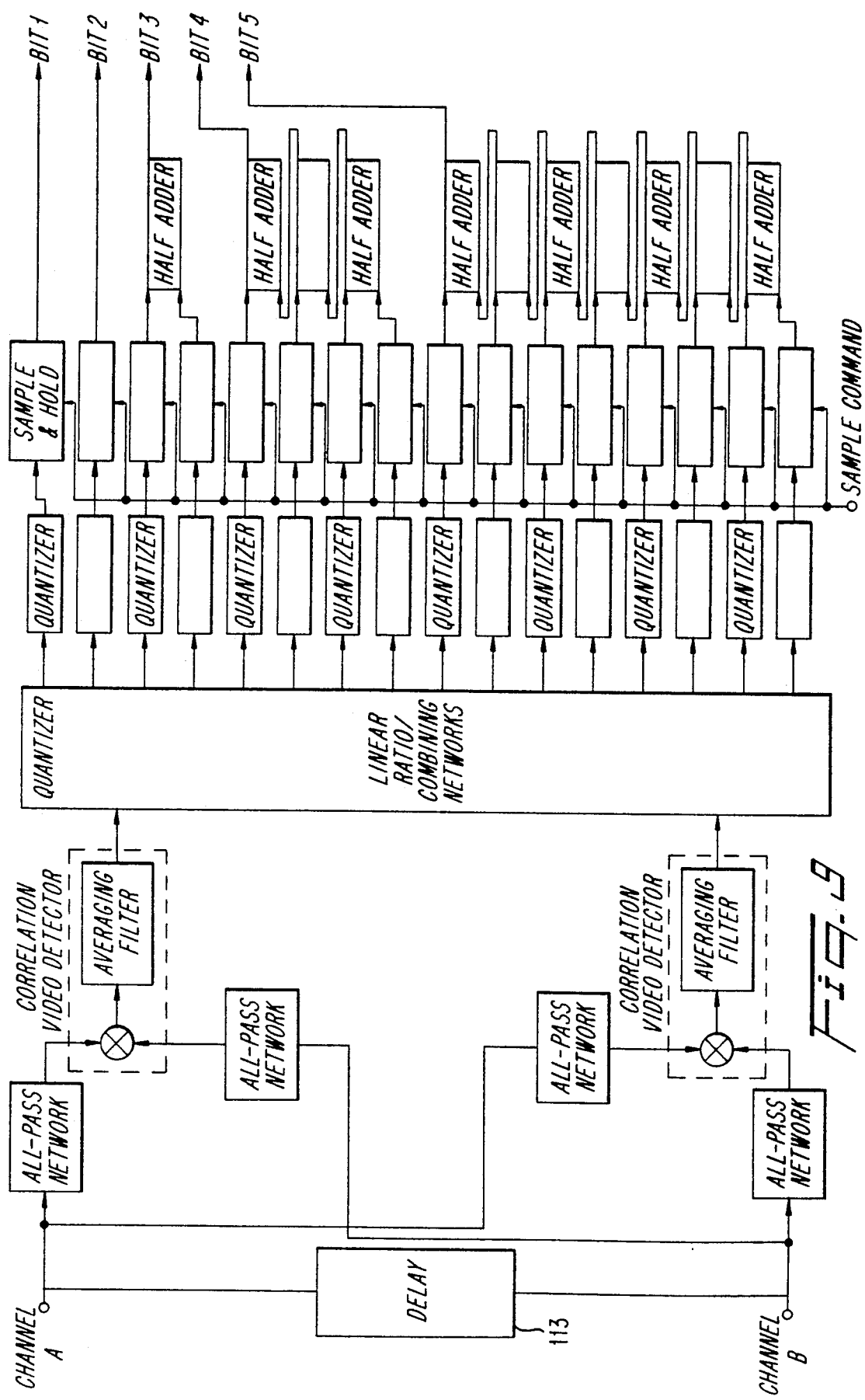
FIG. 9 is a block diagram of the correlation phase detector according to the present invention.
Figure 10:
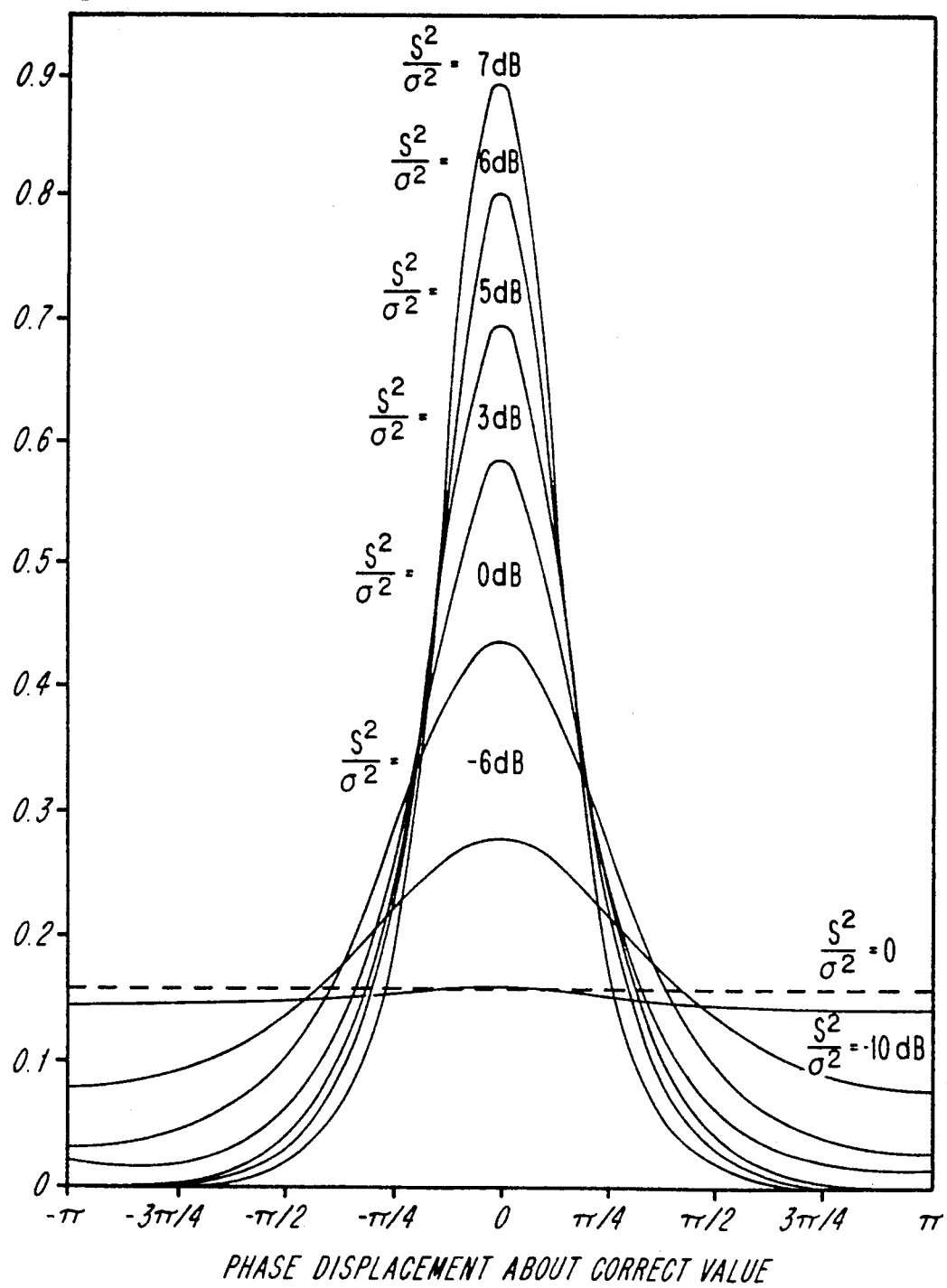
FIG. 10 illustrates the probability density functions for phase displacement around a correct value.
Figure 11A:
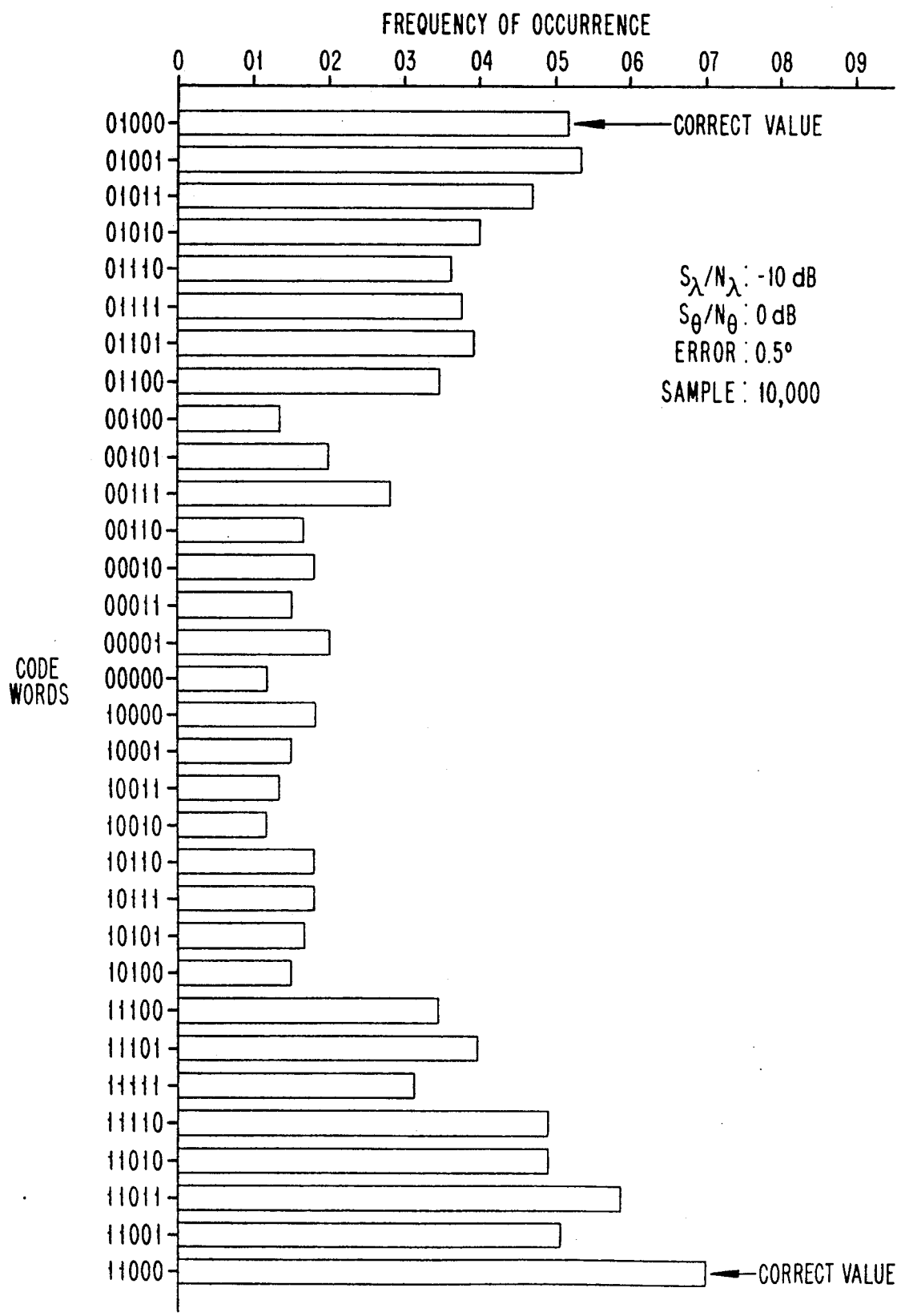
FIG. 11A illustrates a posteriori averaging.

FIG. 9 illustrates the output quantization of the correlation phase detector. The output of each low-pass filter is coupled to a linear ratio combination network, from which are coupled single-bit quantizers or threshold devices. In the particular embodiment shown, there is circuitry for quantization of phase for 5 bits. FIG. 10 is a probability density function for phase displacement about the correct value. FIG. 11A and 11B are histograms of a posteriori averaging of frequency of occurrence of the phase correlator of the present invention.

The general application attribute of the frequency-hopping detector are threefold: (1) Produce means for detection, localization, when used on a mobile platform capable of producing a baseline or two or more simultaneous receiving locations, of hybrid DS/FH or LFM/FH and compound DS/FH/TH and LFM/FH/TH frequency-hopping signals. The detection is accomplished with 3 dB more processing gain than that embodied by the source waveform, since the pulse detection coherency combines the two interferometic channels. Matched bandwidth is not a requirement, since multiple cells can be coherently combined to produce matched bandwidth performance. (2) Direct demodulation of the channel symbols of simplistic frequency-hopping or hybrid and compound frequency-hopping signals, when the source employs M-ary channel encoding. (3) The technique is also applicable to the receiving terminal of cooperative communication circuits, without requiring synchronization to the transmitted signal. This type of application has significant potential benefits, when the received signal is subject to unintentional interference or intentional jamming, inasmuch as the SNR performance of conventional detection techniques during the synchronization period is generally significantly lower than after synchronization has been achieved.

The operational device depends uniquely upon the spatial coherence of the source and is independent of specifics of the received signal. The control logic provides for adaption of the sample period, to accommodate to the specific hop-rate employed by the source, and provides means for discriminating between simple unhopped signals and the frequency-hopped signals of interest, by a simple comparison of multiple sampling periods, to determining which received signals continue to operate at the same frequency and line-of-bearing (LOB) and which signals produce separate frequency dwells at a common LOB. The basic associative parameter is the LOB produced by the source. This same parameter is also effectively employed to separate multiple coexistent signals within the common frequency-spatial field-of-view.

The present invention is a mechanization of a parallel hypothesis testing for the existence of a stable, coherent phase centroid in each of the cells of the channelizer. The embodiments as illustrated in the figures simultaneously search for simple fast frequency-hopping signals and LPI hybrid and/or compound frequency-hopping signals. During each sample collection period, as controlled by the system control processor, if the amplitude threshold is not raised, then samples of the phase detector output, i.e. digital words, are collected at the maximum rate which ensures that the system noise is uncorrelated sample-to-sample.

An estimate of the angle-of-arrival (AOA)-produced phase centroid is identical to the vector sum of the individual sample vectors whose arguments are the individual sample phase measurements. The vector sum of these individually unit-length vectors is completed in real time, by the simple expedient of computing in parallel the running sums of the X and Y components of each sample vector. At the conclusion of each sample event, or time epoch, the arctan(Y/X) is computed to yield the desire estimate of the phase centroid. Note that this procedure is executed exclusively in the AOA-produced phase plane and is not equivalent to individually integrating the output of orthogonal correlators and computing the arctangent of the quadrature component divided by the in-phase component, if and only if signal detection is achieved in both channels. At the end of each data collection period, the samples are simply averaged to produce an estimate of the phase centroid extant during the sampling period, and the frequency-/angle-of-arrival data are placed in a holding buffer. The angle-of-arrival, i.e., phase-value related data field, is used as the associative factor to aggregate frequency fields associated with a common source. Since the basic data words contain the time of the start of each sample, angle-of-arrival and frequency cell, everything needed to recover the basic channel encoding is present, when the succession of data words are assembled as time ordered outputs, corresponding to each of the active frequency-hopping emitters.

If, on the other hand, the amplitude threshold were raised during a given sample period, nominal 11 to 13 dB SNR, then the presumption is that the source is a simple non-hybrid frequency-hopping signal, and the data words are placed in the holding buffer. Each data word contains time-of-threshold crossing, frequency, interior to each of the channelizer individual cells, and angle-of-arrival, i.e., phase measurement. These above-threshold associated data words are placed in a separate area of the holding buffer reserved for simple non-hybrid frequency hopping signals. Again, all data required for recovery of the channel data are present, i.e., time and frequency of hop. Note that this parallel mode of operation is essentially independent of the input signal characteristics, since even a poorly-executed amplitude threshold responds in a few nanoseconds. Thus, the individual device limit on hop rate is defined uniquely by the individual channelizer cell bandwidths.

The basic associative parameter, the angle-of-arrival, and the sample time or time-to-threshold crossings, in the case of simple non-hybrid frequency-hopping signals, is included in each data word. Recovery of all frequency hop types of signals, simple, hybrid FH/DS, or compound FH/DS/TH, is easily effected.

One of the unique features of the correlation phase detector is an unambiguous encoding over the full interval (0°, 360°) which produces a 2:1 increase in angle-ofarrival measurement accuracy, as compared with a conventional phase detector, since a one-wavelength interferometer baseline can be used, if individual antenna field of view of 90° are used. The normal, conventional phase detector is transcendental over the interval (0°, 180°). Consequently, the expectation of robust association and separation of signals is considerably higher than with any other technique.

The coherent processor, which includes the correlation phase detector, plus simple vector processing, produces significant advantages in signal detection, by virtue of implementing a linear transformation from the time-spatial or time-frequency domain, to the correlation domain by execution of a "single point" complex cross correlation between the signals present at the two input ports. Additional detection advantages accrue from effecting all signal detection decisions in this correlation domain.

In its most simple form shown in FIG. 5, the correlation domain is identical to the phase plane defined by the differential delay produced by a plane wave of electromagnetic energy impinging upon a two element interferometer, or some different reflector feed or equivalent, over all possible angles of arrival, or, the phase plane defined by all possible carrier frequencies within the constraint of a finite bandwidth receiving system. In either case, angle-of-arrival-produced phase values or frequency-produced phase values, the "signal present⇌ decision is made by comparing the composite signal, plus noise sum vector magnitude, with that of a uniform distribution in the argument, under the assumption that the source of the noise is the receiving channel thermal noise.

In the classical amplitude decision thresholding, the amplitude of the composite signal-plus-noise signal is compared with the amplitude of the system noise. In this case, the signal plus noise amplitude probability density function is a skewed Rayleigh distribution, compared with the noise amplitude probability density function which is pure Rayleigh or quadratic. A net improvement in SNR accrues to the phase domain decision process for production of specific detection and false alarm, noise-only threshold crossings probabilities.

There are two fundamental modes of application for the coherent processor: (1) where the coherent processing gain uniquely depends upon the spatial coherence of the energy source, see FIG. 12, and (2) where the radio frequency of the source is the correlative parameter, see FIG. 13. When viewed from a distance, all discrete sources appear as point sources and are thus spatially coherent.

In the first mode, spatial coherence, the fundamental embodiment is a simple two-channel interferometer. Since the linear transformation to the angle-of-arrival-produced phase plane is produced by a single-point complex cross correlation of the two interferometer channels, the precise nature of the received waveform, i.e. the electromagnetic wave front, is of no consequence. The waveform may be either random, black body radiation, pure random noise, etc., or deterministic, continuous, pulsed RF, modulated RF such as amplitude, phase or frequency modulated, etc., or any combination, without affecting the detection performance in any way. The output of the in-phase and quadrature-phase correlators of FIGS. 6A and 6B depends uniquely upon angle-of-arrival of the impinging wave front and the amplitude of the signals output by the two interferometer channels. Subsequent non-linear encoding normalizes the outputs to remove any amplitude dependence. The correlator output functions are sinusoidal and cosinusoidal functions whose arguments only contain a single-phase term that depends only upon the angle of arrival. The coherent processing gain produced by a simple-vector summation of multiple samples, each of which is a "normalized" unit vector, such as a digital phase word, taken while the signal is present, is n, the number of samples; if the angle-of-arrival does not change during the sampling event. This necessary and sufficient condition imposes a trivial application constraint, since sampling events of applications interest are microseconds to milliseconds assuring stationarity in angle-of-arrival.

Figure 14:
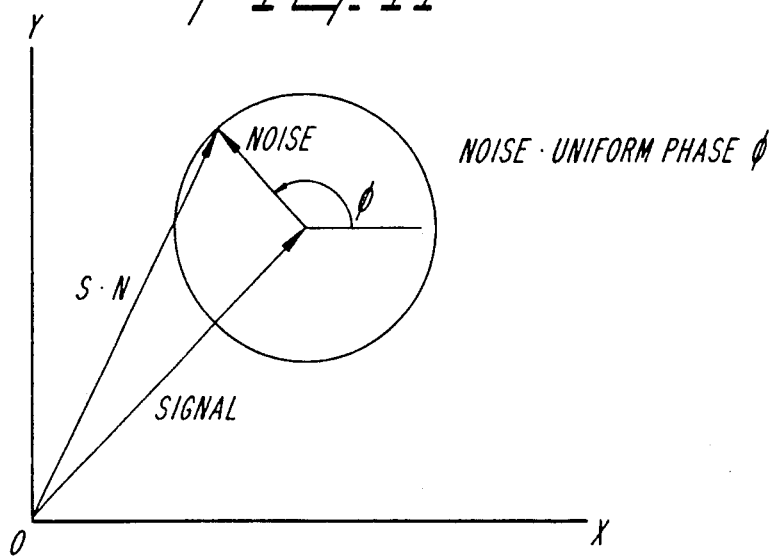
FIG. 14 illustrates instantaneous sample signal and noise relationships.

The signal and noise conditions extant at each sample time are illustrated by FIG. 14. The signal vector has a constant argument, so long as the angle-of-arrival is invariant, while the argument of the noise vector is uniformly distributed and varies randomly from sample to sample. The result is that the probability density function of the argument of the signal plus noise vector, i.e., the quantity measured, is symmetric about the correct value as illustrated in FIG. 10; i.e. the phase detection is an unbiased estimator. If a signal is present, each pulse measurement is a normalized, unit-length vector, whose argument, i.e., phase, is produced by the vector sum of the signal and noise vectors which exist at the measurement sample time. Note that this measurement depends mostly upon the input signal amplitude and angel-of-arrival-produced phase and the noise vector amplitude which is assumed to have a Gaussian probability distribution, and phase which is assumed to have a uniform probability distribution. If time sequential samples, i.e., phase measurements, are taken during a period wherein the angle-of-arrival is constant, then the vector sum of these individual samples is computed, the signal vector components are collinear and thus add coherently, but the noise vector components add randomly. Consequently, multiple signal components add coherently while, at worst, the noise components add in a root-mean-square manner. This process is illustrated by FIG. 15.

Figure 15:
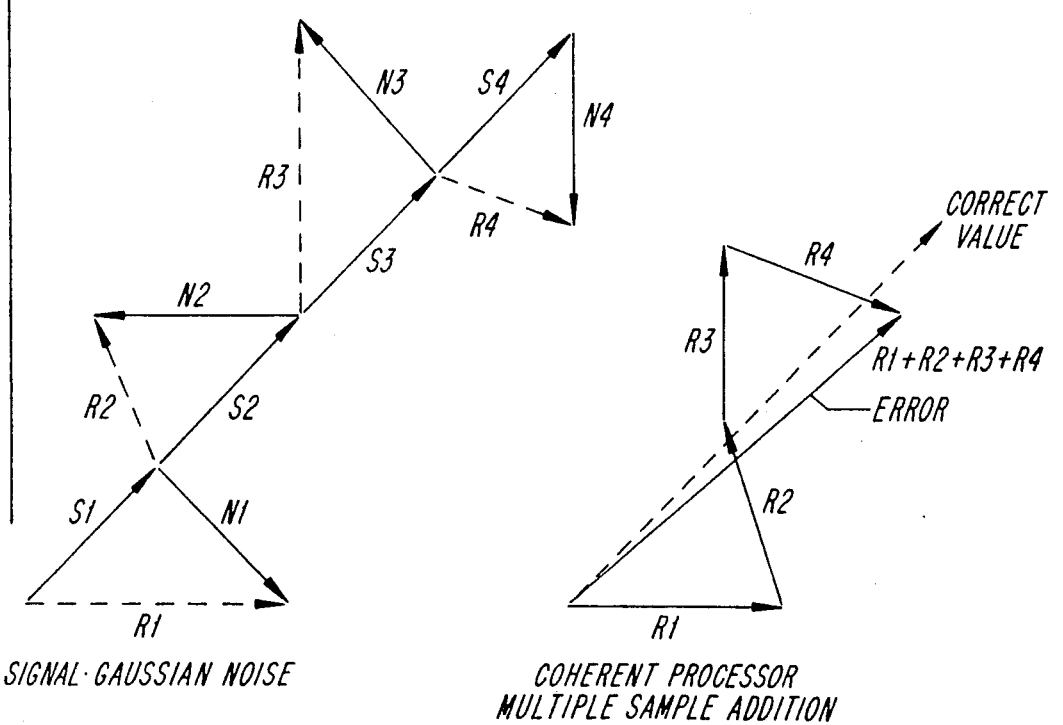
FIG. 15 shows coherent addition of multiple samples.

In FIG. 15, the root-mean-square value of the noise is portrayed, with the instantaneous noise vector magnitude Gaussian distributed, along with the signal vector. The assumed angle-of-arrival is constant during the period occupied by the four samples so, that the signal components add colinearly, i.e., coherently, whereas the argument of the noise vectors is randomly distributed sample to sample.

Optimization of coherent processor applications leads naturally to three distinct areas: (1) Applications uniquely dependent upon the spatial coherence property; (2) Applications wherein either the angle of arrival or frequency is the correlative parameter; and, (3) Applications wherein the phase-plane decision space provides the motivation.

Applications that uniquely depend upon the spatial coherence of the source include the following:
  A. Anti-ARM radar, in which white-noise modulated radar emissions defeat ARM seeker detection and guidance;
  B. Low Probability of Intercept/Detection (LPI/D) Communications which are characterized by true featureless waveform, with low power and nominal SNR at the intended receiver less than 20 dB;
  C. Millimeter wavelength (MMW) or other wavelength, radiometers, which include imaging and/or focal plane array embodiments, which have "super gain" array performance without massive processor;

D. Anti-ARM radar semi-active missile combination, with spatially coherent, waveform independent matched filter performance via single-chip processor, which allows target illuminator radar to operate in anti-ARM mode; and E. Anti-Radar Warning Receiver or other signal intercept/warning device, active missile guidance such as mid-course and/or terminal guidance;

F. LPI/D radar/communications intercept and location, with high detection location efficiency, with processing gain equal to that of the intended receiver, and unaffected by waveform, including featureless white-noise sources; and G. Ultra-sensitive intrusion detection and monitoring, with continuous monitoring for foreign sensor emanations via small, low cost equipment.

Applications A, D and E are specific variants of the basic technique which takes optimum advantage of the fact that all currently deployed, and developmental, anti-radiation missile guidance, signal-intercept, and radar-warning receiver (RWR) systems are based upon direct amplitude discrimination, i.e., signal plus noise-to-noise, to detect signal or pulse presence. In each case, conventional amplitude ratio direction finding or interferometric direction finding systems cannot develop a line of bearing to a pure noise modulated source of energy. The simple expedient of continuously applying wide bandwidth Gaussian noise modulation to each radar pulse assures that these systems do not detect the presence of the radar pulse and that these systems are not capable of generating a line of bearing, or guidance solution, to the radar. Use of the coherent processor as the basic direction finding and signal detection functions by the anti-ARM radar produce full capability performance, or improved performance, as compared to a radar employing classical incoherent multiple-pulse integration. For a combined anti-ARM radar and semi-active missile guidance, the missile guidance is derived from passively detecting, and homing on, the cooperative radar energy reflected from the target. The coherent processor is used a the basic signal detection and DF process in both the radar and semi-active missile. An added benefit is produced by use of this technique, namely, automatic home on jam capability. A standard countermeasure, when under missile attack, is radiation of a high power, relative to the target-reflected signal, noise-modulated signal at the frequency of the illuminating radar, since this relatively inefficient strategy is effective against all classes of radars, if enough power is available to "capture" the radar receiver. In this event, the missile simply sees a large increase in the level of the received target reflected energy and will continue the intercept. Even if the jamming operation were successful in denying effective target tracking by the cooperative illuminating radar, the missile successfully completes the guidance to the target; the jamming signal produces the basic guidance input, even in the absence of the original cooperative illuminating radar.

In a similar fashion, use of the noise-modulated pulse by an active missile seeker prevents detection or direction finding of this "hostile" signal by on-board, amplitude-thresholding warning receiver systems. The coherent processor-based missile receiver properly detects and direction finds the energy reflected from the target which, since no threat warning condition has been displayed, will not be engaged in evasive maneuvers, simplifying the guidance solution and required missile maneuvers.

Use of the coherent processing technique for realization of microwave or MMW radiometers, application C, produces coherent integration gain, if the energy collection antenna set or array were arranged as interferometric pairs. Each incremental thermal source or pixel is spatially coherent, allowing both production of coherent integration, vector summation of multiple samples, and sub-pixel resolution, by the simple expedient of plotting or incrementally-thresholding phase-centroid variations within each pixel. Fully electronic image scanning is easily produced by incrementing an asymmetric delay element, i.e., one inserted in one leg channel of each interferometric pair. This asymmetric delay simply shifts the spatial angle at which each thermal source produces a correlation peak in the angle-of-arrival-produced phase plane.

Figure 16:
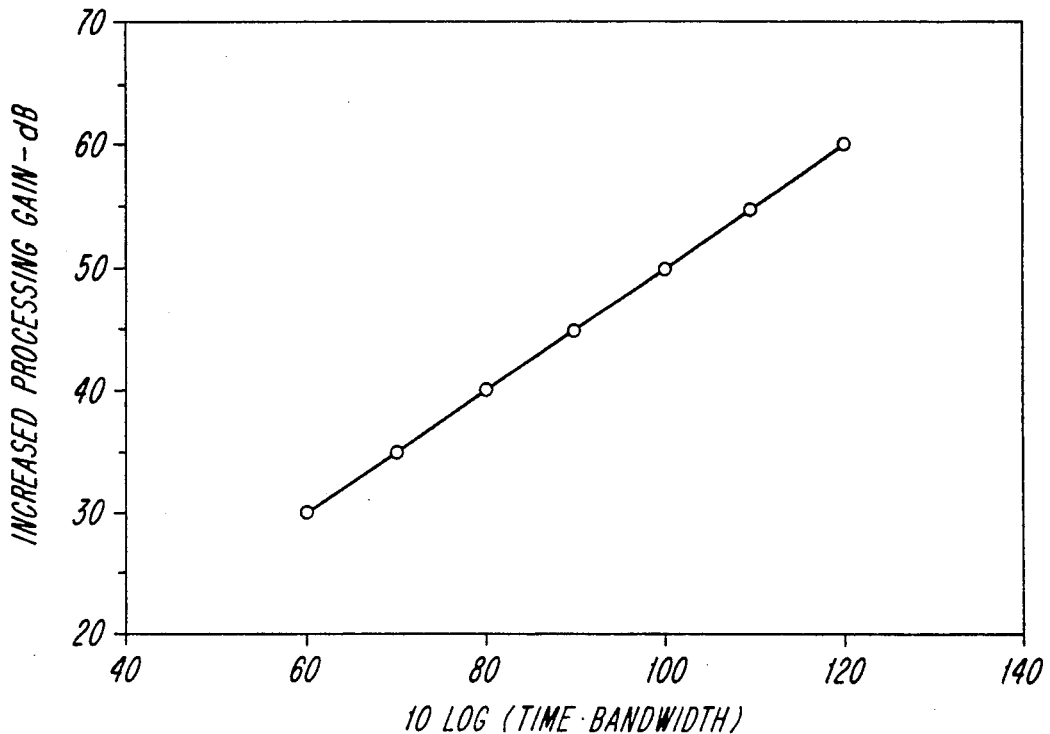
FIG. 16 depicts coherent processing gain enhancement.
Figure 17:
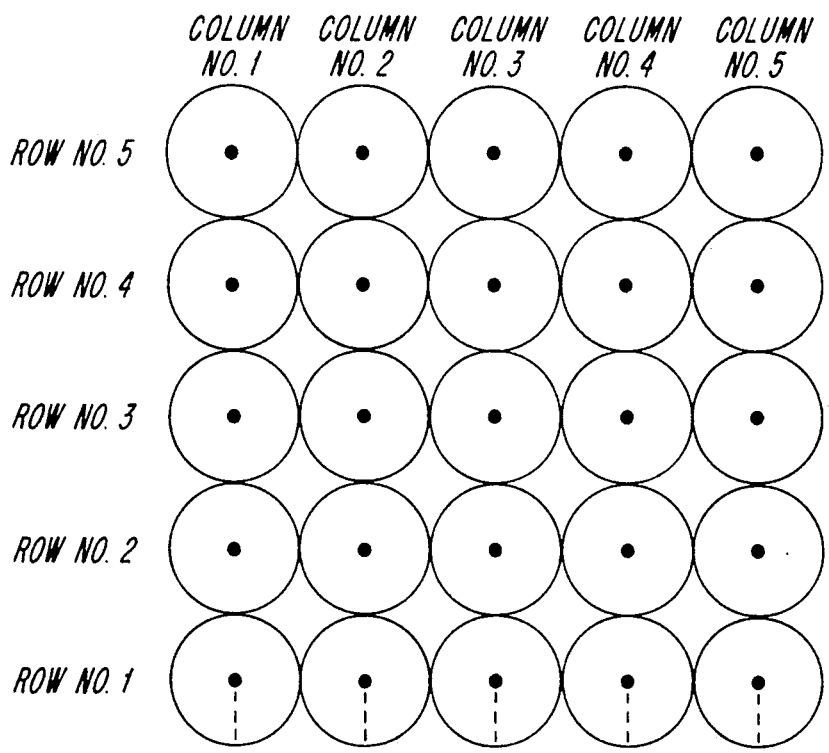
FIG. 17 is a notational millimeter wave imaging radiometer focal-plane array.
Figure 18:
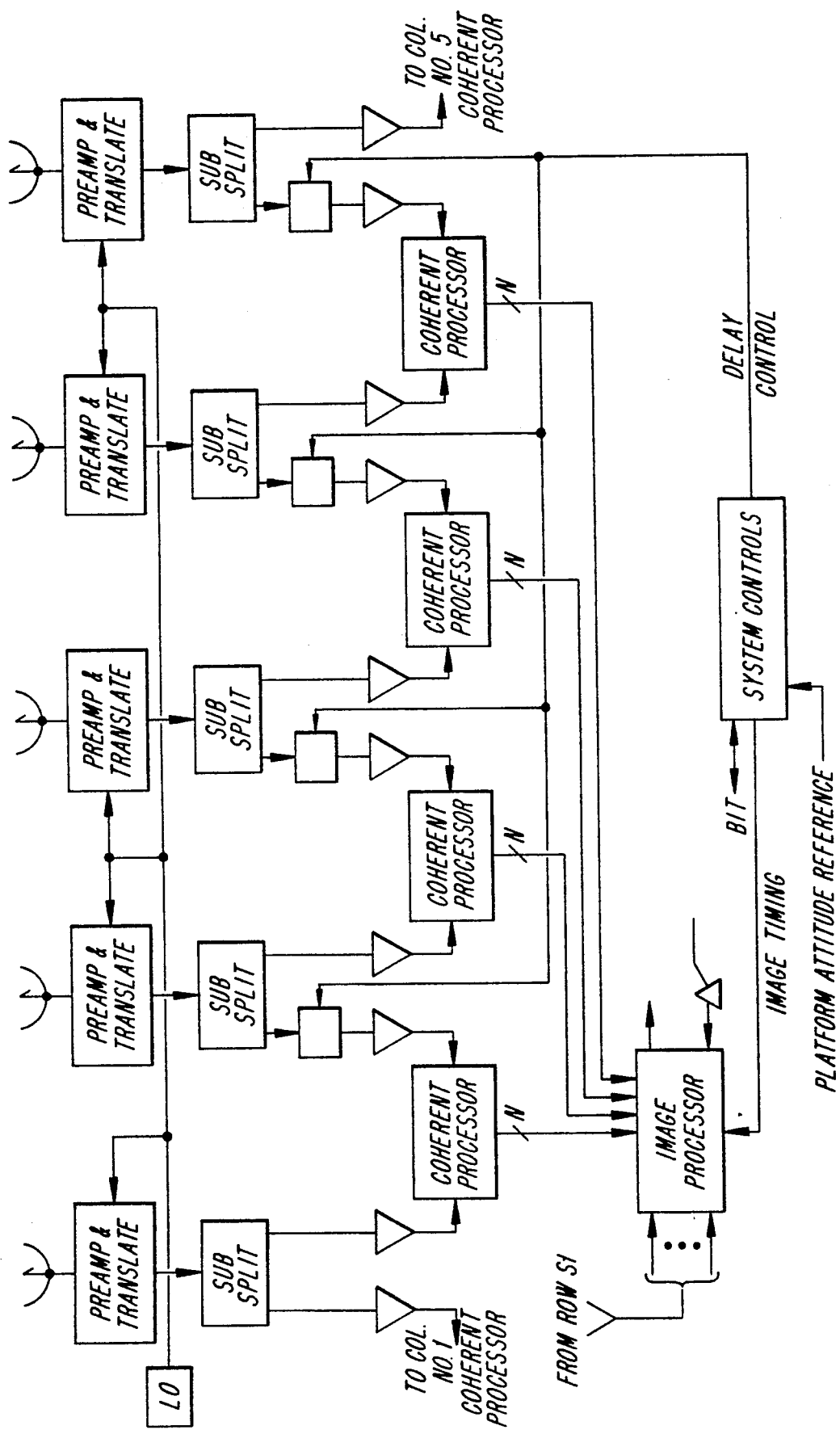
FIG. 18 is a block diagram of a notational focal plane imaging radiometer.

The increased integration gain resulting from the coherent processing and embodiment of a focal plane array imaging radiometer and its associated notional circuitry are shown by FIGS. 16-18, respectively. FIG. 16 illustrates coherent gain enhancement. FIG. 17 shows a notional 35 GHz imaging radiometer focal plane array. FIG. 18 shows a block diagram, notational focal plane imaging radiometer.

The application of the coherent process to realization of a true featureless waveform LPI/D communications system, application B, also depends uniquely upon the spatial correlation property.

This waveform is better than other, more classical, approaches, since the proposed waveform has no observable features and all others do have recoverable features. A large number of types of waveforms have been proposed and/or investigated. They range from a very simplistic direct amplitude modulation of a carrier by Gaussian noise, to very complex, simultaneous transmission of multiple orthogonal pseudorandom sequences. In each case, the fundamental detection strategy has been recovery of the spreading gain via cross correlation of the input signal with a known sequence, or sequences, to recover the original bit stream. The needed synchronization with the source requires the fundamental event regularity which produces a spectral line, or lines, recoverable by an effective feature detector. One approach to reducing the affectivity of feature detection has been random modulation of the basic chip timing. Although this technique broadens the timing line spectra, it reduces the available processing gain at the intended receiver, to the same degree as that at the interceptor with a net nil improvement.

Recent interest in "impulse radars" have stimulated some practitioners to postulate "impulsive" communications systems. In general, they have used a form of pulse position modulation (PPM) to convey information. Detection of the basic channel and frame rates is a simple chore for even rather poor feature detectors. In at least one case, recognition of the fundamental problem has led to the use of a dual transmission mode wherein the system uses two RF to transmit data on one frequency, i.e., randomized, noiselike, without any repetitive features, and the second RF to transmit synchronization, timing, information. Although at first blush this would seem to solve the problem, it is a specious solution. Any reasonable intercept operation should be able to correlate the two transmissions.

In it's most simple form, the proposed waveform has no repetitive feature, other than the constant dwell duration. If this very small spectral component is assessed to be a potential problem, then, the dwell period easily can be randomized.

The consequence of the proposed use of band-limited white noise for reduction in spectral power density, as contrasted with use of a high-rate pseudorandom BPSK dwell modulation, plus compound pseudorandom frequency and time modulation for information transmission under control of an existing TRANSEC chip, reduces the spectral content of any repetitive features, such as constant dwell period for the simplified waveform to a negligible value. The adversary is forced to use some form of radiometer for signal detection. In this case, no information is available to the opponent, regarding characteristics of the transmission or content and very little potential for localization of the communications source. Inclusion of strict radiated power management is necessary in any case of LPI/D operations to limit the intended receiver input SNR ($E_b/N_o$) to $-20$ dB results in large communicate-to-intercept range ratios, unmatched by other more "classical" techniques.

For an example system configuration, a dual pseudorandom M-ary encoding is envisioned for the time and frequency domains. For purposes of the example, a 32-ary frequency encoding is selected to produce reasonable anti-jam performance. In this case, since there are 32 discrete dwell frequencies, each channel symbol has a value of 5 bits. The basic receiving configuration is shown by FIG. 1. As can be seen from the block diagram, the received terminal includes a two channel interferometer which has two identical M-ary channelized detectors.

Figure 19:
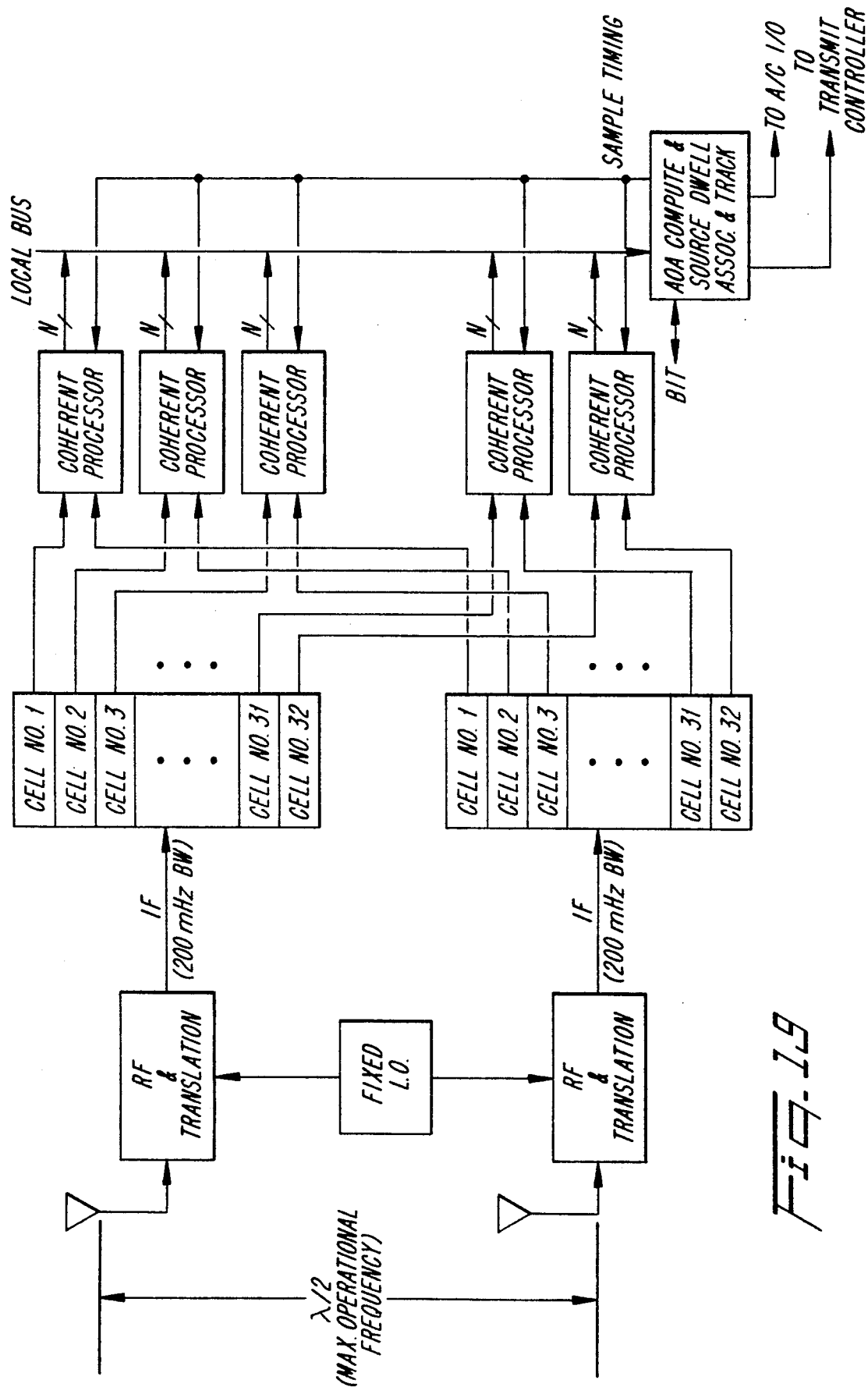
FIG. 19 is a block diagram of a LPI/D receiver.

In the exemplary system shown in FIG. 19, 32 coherent processors are connected between corresponding cells of the two channelizers, M-ary detectors. The 32 processors effect a parallel search using contiguous time epochs, each of which corresponds to the transmitted frequency dwell periods. Even if no gross rate synchronization were included, normally effected during an initial power adjustment transmission preamble, then the maximum loss in performance is 3 dB, which can only occur when the received frequency dwell exactly straddles the sampling epoch boundary, i.e., falls equally in two adjacent time sampling epochs.

Each sampling epoch is processed independent of all other epochs, and a decision is made as to "signal present" or "signal not present" in each epoch. This is precisely the demodulation of channel symbols, M-ary frequency encoding, that is required. The 32 processors continuously sample the 32 channelizer cell outputs so that channel symbol recovery in no way depends upon synchronizing with the transmitted frequency-hopping pattern, as is the case for conventional frequency-hopping systems. Similarly, the use of contiguous time sampling epochs accurately demodulates the time-hopping attribute of the compound time and frequency-hopping waveform.

The angle-of arrival produced-phase centroid estimate produced at the end of each sampling epoch is converted to spatial angle-of-arrival by the common processor, nominally, by way of example, a MC 68030 class microprocessor, so that each dwell is properly associated with a common source. Note that if orthogonal codes were used by the system to minimize the collisional probability, up to 32 simultaneous sources can be properly received by a single receiver, since all 32 channelizer cells are processed in parallel and independently. If the system were installed on an aircraft, the dwell association/control processor must receive an input from the aircraft inertial system, in order to convert the relative angle-of-arrival measurement to spatial coordinates; otherwise, aircraft maneuvers produce errors in the dwell-association process. Simple angle-of-arrival tracking of each cooperative source is required, if the individual transmission lengths are sufficiently long that the source/receiver geometry could change materially during a given transmission. Note that short-term platform perturbations are corrected, via the platform attitude reference system input. Any source-angular tracking that may be required can be easily effected by a simple first order Kalman filter, in essentially the same way that electronic intercept (ELINT) systems develop a geolocation for intercepted emitters.

Detection of errors is quite straight forward. Steady state interference can be ameliorated by a vector subtraction process, shown by FIG. 20. As shown by the figure, if the $N^{th}$ sampling epoch contains one, or more, interfering signals, then the epoch sum vector defines the centroid estimate for the combined interference, i.e., the centroid of the amplitude(s) and angle(s)-of-arrival. If the next sampling epoch also contained a desired signal frequency dwell, which includes an interfering signal, then the vector sum of the desired signal and interfering signals produces a net sum vector whose magnitude and argument define the centroid of the desired and interfering signals in angle-of-arrival space and amplitude, as shown notionally by FIG. 20. The vector difference between the sum vectors produced by each sampling epoch then accurately reflects the centroid in the desired signal angle-of-arrival produced-phase distribution. Note that, even though each phase measurement is normalized to unit magnitude, it is correct to assign weighting factors to each epoch sum vector used in the differencing process, since the magnitude of the epoch sum vector accurately reflects the input signal amplitude.

Interference produced by a collision between two cooperative sources produces an angle-of-arrival measurement which is defined by the centroid, in relative amplitude and bearing to the sources. The resulting phase centroid estimate does not coincide with that associated with any of the sources then operative. Detection of a centroid estimate that does not agree with any of the currently active sources causes output of an error character channel symbol. Similarly, if a valid detection is not output during a time frame of the time-hopping sequence, i.e., a simple time out, an error character is also output. The centroid estimation sum-vector magnitude is a direct quality factor that can support a "soft decision" processing. Inclusion of error detection and correction (EDAC) should not be required for voice communications, but, should be considered for data transmission.

With one exception, the above discussed applications uniquely depend upon exploitation of the spatially coherent properties of the source. If, for overall system performance reasons, the receiving segment of the system has an effective noise bandwidth that is much greater than the spectral occupancy of the desired or target waveform of 10:1, or greater, then the alternative form of the processor in FIG. 13 can be used effectively. In this case, the delay that is inserted to decorrelate the system noise at the two input ports, $T = 1/B_e$, does not materially decorrelate the signal components or introduce significant distortion of the signal waveform, since the delay is significantly less than the correlation period of the signal. This conclusion is valid, independent of the nature of the desired or target waveform, deterministic or random.

An exemplary arrangement of a second embodiment of the present invention can be understood as comprising delay means and phase means. The delay means may be embodied as a delay line or an equivalent circuit, which can serve as a delay line, using discrete or integrated components. The delay means delays a received signal between a first port and a second port. Received signal is meant to include any signal to be processed by the apparatus and method of the present invention. For the delay line, the received signal is assumed at the first port, and a delayed-received signal, which is the received signal passed through the delay line, is at the second port.

Similarly, the delay means may be realized as a first antenna serving as the first port, and a second antenna serving as the second port. The first antenna and the second antenna may be embodied as antennas used for electromagnetic waves, or acoustic transducers, as found in sound propagation. The first antenna is assumed to receive the received signal, and the second antenna receives a delayed-received signal. The delayed-received signal is a function of the distance between the two antennas, angle-of-arrival of the received signal, and wavelength, which is inversely proportional to the frequency of the received signal. The angle of arrival of the received signal is assumed known. For example, an independent source may provide the angle of arrival.

The phase means may be embodied as a correlator, which correlates the received signal from the first port with the delayed-received signal from the second port, to generate a phase estimate. The present invention requires that the correlator be linear The phase estimate is a function of the time delay, $\tau$, between the first port and the second port, and wavelength of the received signal. The phase estimate can be used to estimate the wavelength and, therefore, frequency of the received signal.

The second major area of application of the coherent processing technique can use either application configuration of FIGS. 12 and 13, or both, with equal performance benefits. Three specific applications in this category have been examined at this point in time. A non-exhaustive listing of these specific applications follows:
(1) Anti-radiation and semi-active missile guidance,
(2) Radar Warning Receiver (RWR) and Electronic Support Measures (ESM) or ELINT systems, and
(3) Coherent on Receive-Only Monostatic and Bistatic Radar Systems.

In each case, the use of the coherent technique orients the basic pulse detection to the energy of the pulse, rather than to peak amplitude or some fraction thereof, if a "normalized" thresholding is used. This reorientation to detection of transmitted energy is particularly important for detection and localization of modern high-duty factor radars. Radar target detection performance depends primarily upon the transmitted power-aperture product, i.e., product of average transmitted power and effective area of the transmitter antenna. Conventional radar systems employ a nominal duty factor of 0.1%, i.e., the ratio of pulse duration-to-period between pulses, so that the ratio of peak-to-average power is 1,000:1, 30 dB. Modern pulse Doppler radars employ duty factors of the order of 0.1 or greater; the peak-to-average power ratio is only 10:1, or less. The net effect on receivers using peak pulse amplitude detection strategies, all currently operational ARM seekers, RWR an ESM/ELINT systems, is a minimum effective net reduction in operational sensitivity of 100:1, 20 dB. This reduction in sensitivity, to this class of modern radar, equates to a 10:1 reduction in detection/intercept range, all other factors being equal.

Figure 20:
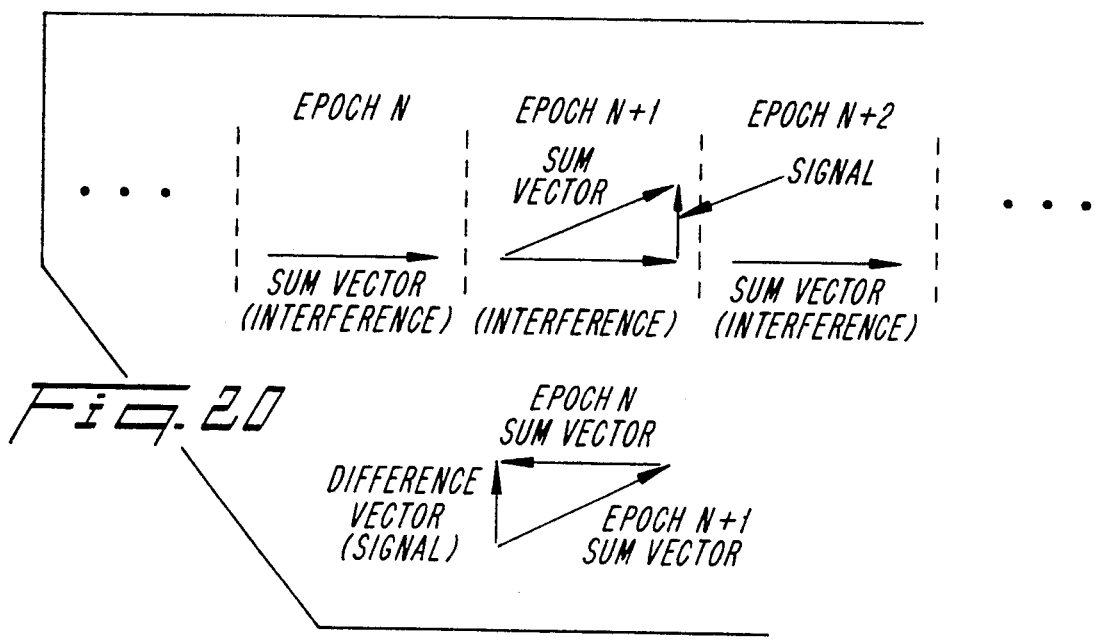
FIG. 20 shows post-processing interference removal.
Figure 21:
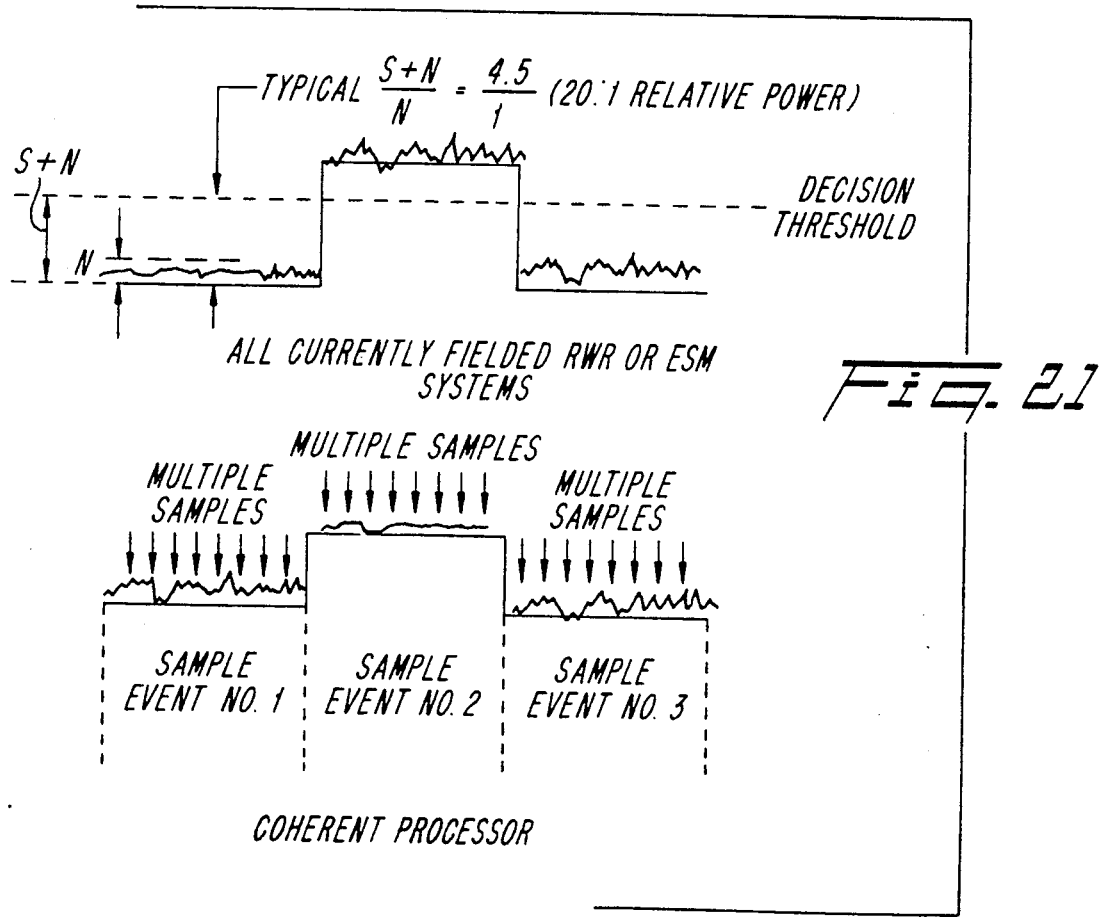
FIG. 21 shows a comparison between conventional pulse amplitude detection and the present invention.

A comparison between the amplitude-decision thresholding and the energy-oriented decision process is depicted by FIG. 21. As shown by FIG. 20, the coherent processing strategy samples the input predetection spectrum, via a continuous sequence of time-contiguous sampling epochs, with the rate of sample collection constrained only by the effective system noise bandwidth, $T_s = 1/B_e$; this assures that the system noise is not correlated sample-to-sample. Each sampling epoch is processed independent of all others, i.e., the vector sum vector is compared with a running average of the noise background vector sum in each of those epochs containing only noise. The "pulse present"-decision process thresholding is made in the phase plane, so that the decision is always made relative to a uniformly distributed noise background, as discussed above. Thus, two improvements accrue, compared to the "classical" amplitude decision-intra-pulse coherent integration and the decision space which affords an improvement in sensitivity, as compared to the amplitude domain decision. Typical monopulse sensitivity/range improvement is noted in FIG. 20.

Uncertainty in the pulse time-of-arrival is minimized by setting the sampling epoch size equal to the dominant pulse duration used by target radar systems in each RF region, e.g., nominal 10 microseconds for VHF, 3 to 5 microseconds for S-band, and 0.8 to 1.0 microseconds for C and X bands.

Figure 22:
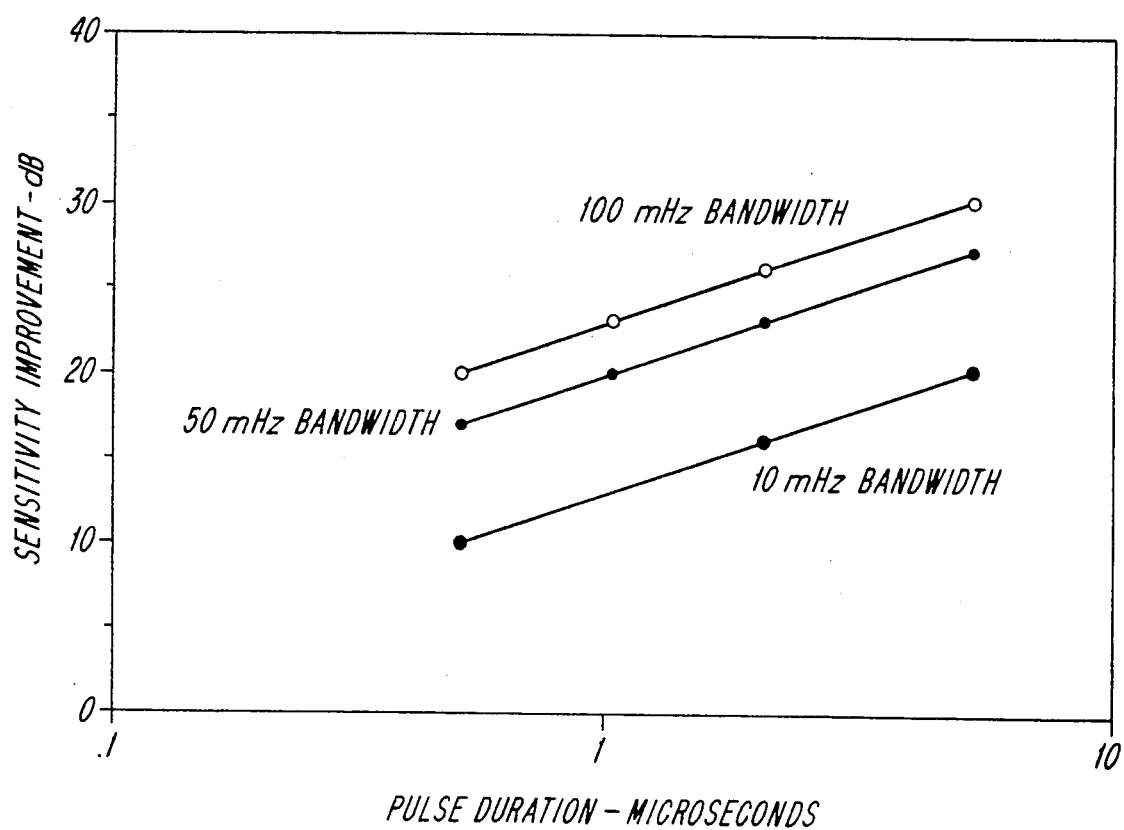
FIG. 22 shows coherent processor monopulse sensitivity improvement.

Additional sensitivity improvement can be effected by coherent vector summation of the individual epoch sum vectors for pulses emitted by the same radar. The number of pulses available for this inter-pulse summation is bounded by either the maximum-allowable frequency-dwell period, ESM, RWR, or ELINT system, or the number of pulses which typically illuminate a target, monostatic or bistatic radar application. Nominal current radar design fixes spatial scan rate and transmitter antenna beamwidth to produce average target illumination by 16 pulses, a potential processing/sensitivity gain of 16:1, which is 12 dB, as compared to the maximum incoherent gain of 4:1, 6 dB. Monopulse single sampling epoch-sensitivity improvement, as a function of system noise bandwidth and radar pulse duration, is shown by FIG. 22.

The system sensitivity improvements are available, using either mode of coherent processing, spatial coherence or frequency. In most applications, it is preferable to use both application modes, in parallel, to minimize any errors in association of individual received pulses with a common source radar. Parallel use of both processing strategies produces two, robust association parameters, each with equivalent improvement capability, angle-of-arrival, and operating frequency.

One subtle artifact of the vector sample-set summation technique is that the magnitude of the sum vector of the samples contained in each epoch is directly related to the amplitude of the input signal, even though the individual sample vectors are generated as a "normalized" unit vector which is independent of the input signal amplitude. Since the number of samples is always known, the processed SNR is known, which is inferred from the epoch sum vector magnitude, and since the noise background level is continuously measured, the input signal level can be directly computed. This allows more freedom in application. For example, the coherent technique can be directly applied to systems that employ amplitude ratio monopulse angle-of-arrival measurement techniques, by the simple artifice of using a frequency domain coherent process of FIG. 13 in each of the normally squinted antenna channels. By using identical size sampling epochs for each antenna channel, the desired amplitude ratio(s) can be directly computed from the individual epoch sum vector moduli.

The third generic area of application for the coherent process is as a differential phase demodulator. The basic embodiment shown by FIG. 13, is similar to the frequency domain configuration of FIG. 13. In fact, for matched bandwidth detection of digital phase-modulated waveforms, the value of delay used is identical to that of FIG. 13. The commonly-used definition of "matched bandwidth" detection is where the reception 3 dB bandwidth exactly encloses the principal spectral lobe of the signal. For a digital data stream with bit period T, the matched bandwidth is $B=2/T$. The corresponding delay required to ensure that the system noise is decorrelated at the two input ports of the processor is $T=1/B=T/2$. A classical differential phase-shift keying, digital-phase modulation, demodulator delays one input to a phase detector by one-half of a bit period, so that the phase of successive bits is compared to define logic state (1,0) transitions and, thus, demodulate the PSK sequence and recover the original bit stream. A simple timing diagram is shown by FIG. 23. The input signal is a simple bi-phase modulated carrier, shown in the figure as a video non-return-to-zero (NRZ) bit stream. The two-state phase detector output is shown on the third timing line. Application of this detector output to the "state change" input of a bistable multivibrator or software equivalent causes a state change and recovery of the original NRZ bit stream. It is clear that the same bit-stream recovery is produced for multiphase shift modulated waveforms; the phase encoding granularity must be adjusted to a level consistent with the phase measurement resolution required by the input modulation; otherwise, the process is identical for these higher-order modulation techniques, such as ternary, quaternary, etc. The linear transformation executed by the techniques negates the abrupt performance threshold associated with conventional phase detection techniques which results from the amplitude normalization hard limiting used by these techniques. The result is improved-bit error-rate performance. Additionally, if non-matched reception is employed, the use of the coherent processing technique allows reduction in bit error rate at a given input SNR $E_b/N_o$, by vector summation of multiple samples taken during each bit period.

It will be apparent to those skilled in the art that various modifications may be made to the spread-spectrum coherent processor of the instant invention, without departing from the scope or spirit of the invention, and it is intended that the present invention cover modifications and variations of the spread-spectrum coherent processor, provided they come within the scope of the appended claims and their equivalents.

I claim:

1. A method for inference detecting a received signal in noise, comprising the steps of:
   coherently summing a plurality of samples of the received signal;
   generating a correlation function phase signal, from the summed plurality of samples of the received signal, using a correlator phase detector;
   phase centroiding, using a signal device, the correlation function phase signal to generate a phase centroid estimate vector;
   comparing, using a comparator, a scalar value of the phase centroid estimate vector to background noise to detect the received signal.

2. The method as set forth in claim 1, further including the step of coherently running multiple signal events by vector addition of a plurality of phase centroid estimate vectors of a plurality of independent signal events.

3. An apparatus for inference detecting a received signal in noise, comprising:
   means for generating from the received signal a plurality of samples of the received signal;
   a correlation phase detector for generating, from the plurality of samples of the received signal, a correlation function phase signal;
   a signal device for phase centroiding the correlation function phase signal to generate a phase centroid estimate vector; and
   a comparator for comparing the phase centroid estimate vector to background noise to detect the received signal.

4. The method as set forth in claim 3, further including means for coherently running multiple signal events by vector addition of a plurality of phase centroid estimate vectors of a plurality of independent signal events.

* * * * *